US008244813B2

(12) United States Patent
Kasatani

(10) Patent No.: US 8,244,813 B2
(45) Date of Patent: *Aug. 14, 2012

(54) OUTPUT TERMINAL APPARATUS FOR PRINTING DATA BY EMAIL

(75) Inventor: Kiyoshi Kasatani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 580 days.

This patent is subject to a terminal disclaimer.

(21) Appl. No.: 11/830,218

(22) Filed: Jul. 30, 2007

(65) Prior Publication Data

US 2008/0295166 A1  Nov. 27, 2008

Related U.S. Application Data

(62) Division of application No. 09/783,594, filed on Feb. 15, 2001, now Pat. No. 7,366,758.

(30) Foreign Application Priority Data

| Feb. 16, 2000 | (JP) | 2000-037744 |
| Feb. 16, 2000 | (JP) | 2000-037745 |
| Feb. 16, 2000 | (JP) | 2000-037749 |
| Feb. 9, 2001 | (JP) | 2001-034268 |

(51) Int. Cl.
*G06F 15/16* (2006.01)
(52) U.S. Cl. ........ 709/206; 709/207; 709/217; 709/228; 379/93.24; 379/100.08
(58) Field of Classification Search .................. 709/201, 709/206, 207, 204, 217; 358/1.15, 440, 401, 358/402, 468, 438; 379/93.02, 93.24, 100.08
See application file for complete search history.

(56) References Cited

U.S. PATENT DOCUMENTS

| 5,699,258 | A | * | 12/1997 | Thiel | 705/409 |
| 5,920,404 | A | | 7/1999 | Weiser | |
| 6,029,137 | A | * | 2/2000 | Cordery et al. | 705/60 |
| 6,182,225 | B1 | | 1/2001 | Hagiuda et al. | |
| 6,240,445 | B1 | | 5/2001 | Kumar et al. | |
| 6,292,211 | B1 | | 9/2001 | Pena | |
| 6,338,049 | B1 | * | 1/2002 | Walker et al. | 705/44 |
| 6,438,574 | B1 | | 8/2002 | Nagashima | |

(Continued)

FOREIGN PATENT DOCUMENTS

JP  64-82726  3/1989

(Continued)

OTHER PUBLICATIONS

Webopedia, Webopedia.com, http://www.webopedia.com/TERM/e/e_mail.html.

*Primary Examiner* — Barbara Burgess
(74) *Attorney, Agent, or Firm* — Oblon, Spivak, McClelland, Maier & Neustadt, L.L.P.

(57) ABSTRACT

An apparatus includes a communication unit which receives email through a communication line, the email having been sent by a user and including a first identifier and data. The apparatus further includes an accumulation unit which stores therein the data, a printout unit, an input unit which receives a second identifier entered by the user through direct operation thereof, and a control unit which controls the printout unit to print the data corresponding to the first identifier by reading the data from the accumulation unit if the second identifier matches the first identifier.

1 Claim, 27 Drawing Sheets

U.S. PATENT DOCUMENTS

| | | |
|---|---|---|
| 6,522,421 B2 | 2/2003 | Chapman et al. |
| 6,614,551 B1 | 9/2003 | Peek |
| 6,711,677 B1 * | 3/2004 | Wiegley ................. 713/151 |
| 6,750,982 B1 * | 6/2004 | Takaira et al. ............. 358/1.9 |
| 6,865,620 B2 | 3/2005 | Homma |
| 7,366,758 B2 * | 4/2008 | Kasatani ................. 709/206 |
| 2003/0059010 A1 * | 3/2003 | Toyoda et al. ............ 379/93.24 |
| 2003/0187951 A1 | 10/2003 | Shen |

FOREIGN PATENT DOCUMENTS

| | | |
|---|---|---|
| JP | 5-2541 | 1/1993 |
| JP | 5-143253 | 6/1993 |
| JP | 11-150559 | 6/1999 |
| JP | 11-154070 | 6/1999 |
| TW | 367674 | 8/1999 |

* cited by examiner

FIG.9

| LINE NUMBER | |
|---|---|
| 1 | [CopyrightInfo] |
| 2 | String=ⓒ1999TRRO CO.,LTD |
| 3 | Price=¥300 |
| 4 | POSCode=11223456 |
| 5 | Print=Backside,BottomLeft,Small |

FIG.22

```
1   [color@company.com]
2   Print=(1-15)*2
3   Transfer=mono@company.com, shisha@sapporo.company.com, 03-4444-5555 "G4Fax"
4
5   [monor@company.com]
6   Print=(1-15)*10
7
8   [03-4444-5555]
9   Print=(1-15)*1
10
11  [shisha@sapporo.company.com]
12  Print=(1,3)*1
13  Transfer=011-222-3333 "G3Fax" , ifax@sapporo.company.com "InetFax"
14
15  [011-222-3333]
16  Print=1*1
17
18  [ifax@sapporo.company.com]
19  Print=(1,10)*1
```

FIG.23

```
1  [color@company.com]
2  Print=(1-15)*2
3  Transfer=%MonoPrinter%
4
5  [%MonoPrinter%]
6  Print=(1-15)*10
```

FIG.24

```
%MonoPrinter%=mono@company.com
```

FIG.25

```
1   [color@company.com]
2   Print=(1-15)*2
3   Transfer=mono@company.com, shisha@sapporo.company.com, 011-222-3333 "G3Fax"
4
5   [mono@company.com]
6   Print=(1-15)*10
7
8   [03-4444-5555]
9   Print=(1-15)*1
10
11  [shisha@sapporo.company.com]
12  Print=(1,3)*1
13  Transfer=03-4444-5555 "G4Fax" , ifax@sapporo.company.com "InetFax"
14
15  [011-222-3333]
16  Print=1*1
17
18  [ifax@sapporo.company.com]
19  Print=(1,10)*1
```

FIG.26

```
1   [color@company.com]
2   Print=(1-15)*2
3   Transfer=mono@company.com, shisha@sapporo.company.com, 03-4444-5555 "G4Fax"
4   Transfer=011-222-3333 "G3Fax" , ifax@sapporo.company.com "InetFax"
5   [mono@company.com]
6   Print=(1-15)*10
7
8   [03-4444-5555]
9   Print=(1-15)*1
10
11  [shisha@sapporo.company.com]
12  Print=(1, 3)*1
13
14
15  [011-222-3333]
16  Print=1*1
17
18  [ifax@sapporo.company.com]
19  Print=(1, 10)*1
```

FIG.27

1  03-6666-7777, color@company.com
2  011-444-5555, shisha@sapporo.company.com
3  092-888-9999, shisha@fukuoka.company.com

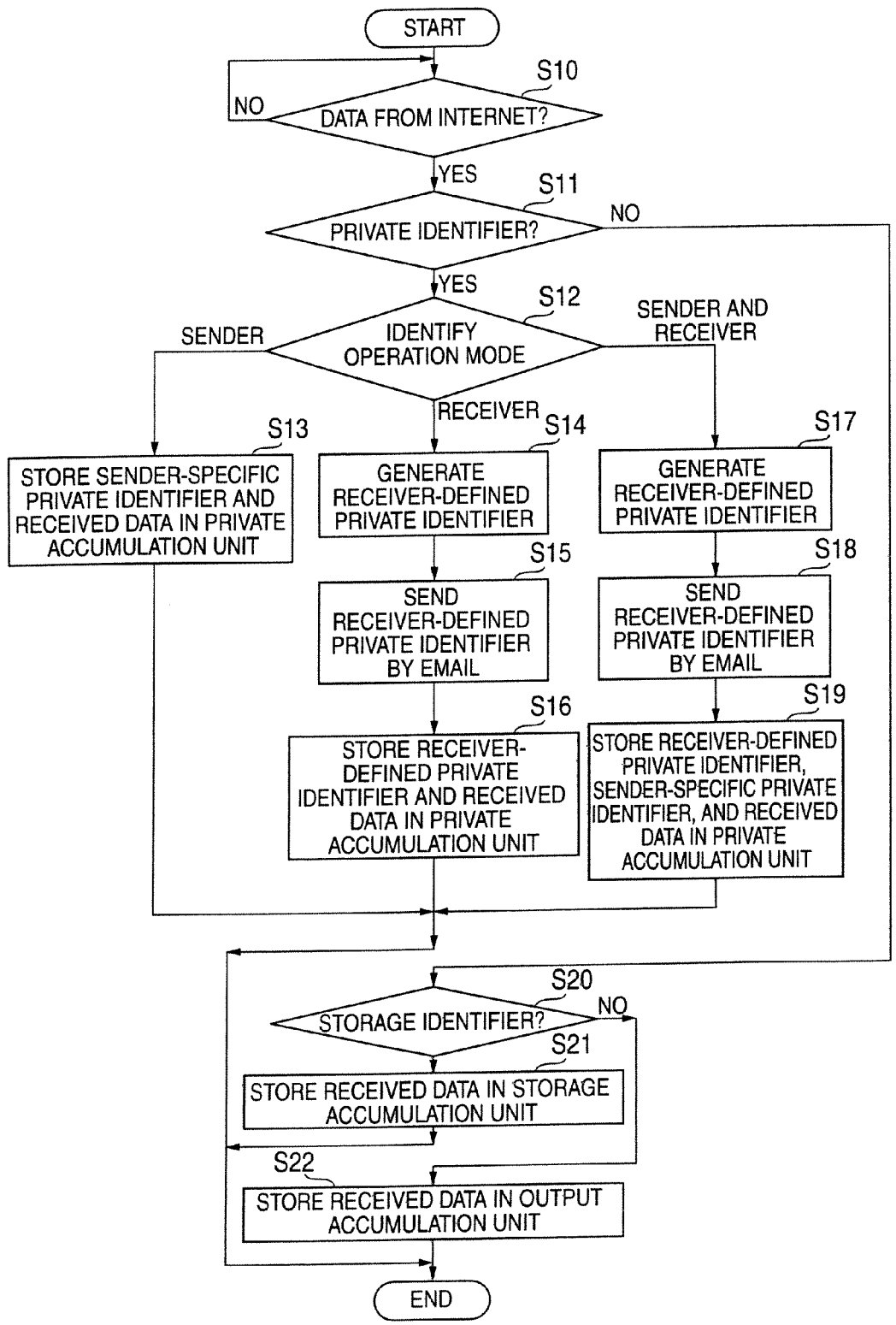

OUTPUT TERMINAL APPARATUS FOR PRINTING DATA BY EMAIL

CROSS-REFERENCE TO RELATED APPLICATIONS

This application is a Divisional of U.S. patent application Ser. No. 09/783,594, filed Feb. 15, 2001 now U.S. Pat. No. 7,366,758, and claims priority to Japanese Patent Application Nos. 2000-037744, filed Feb. 16, 2000; 2000-037745, filed Feb. 16, 2000; 2000-037749, filed Feb. 16, 2000; and 2001-034268, filed Feb. 9, 2001. The contents of the above applications are incorporated herein by reference.

BACKGROUND OF THE INVENTION

1. Field of the Invention

The present invention generally relates to data-output apparatuses, and particularly relates to a data-output apparatus that outputs digital data supplied via a communication channel.

2. Description of the Related Art

In the office environment or the like, a generally employed configuration is that a printing apparatus such as a printer is shared by a plurality of computers via a LAN or the like. A printer accessible from a computer transmitting data in such a configuration is limited to those directly connected to the LAN to which the computer is connected, and it is not possible to output data on a remote printer beyond the boundary of the LAN.

Against this background, Japanese Patent Laid-open Application No. 5-002541 discloses a system in which a computer transmits data by email, and a printer receives the email to print the data. In this system, data that is transmitted via email is automatically printed out, and, thus, is not suitable for such an environment as a large number of unidentified users share the use of the printer since printouts in such an environment should not be accessible by anyone else other than the owners of the printouts.

In order to keep the printouts out of reach of strangers, Japanese Patent Laid-open Application No. 5-143253 discloses a system in which the printer manages and controls passwords or personal identification numbers of the users. This system, however, requires passwords or personal identification numbers to be registered in advance, so that it is not perfectly suitable for use by a large number of unidentified users. Also, there is an additional load on the printing apparatus such as the printer since the printer needs to allocate some of its resources to management and control of the password or the personal identification numbers.

Accordingly, there is a need for a data-output apparatus that can attend to remote outputting of data received via email in an environment suitable for use by a large number of unidentified users.

SUMMARY OF THE INVENTION

Accordingly, it is a general object of the present invention to provide an apparatus that substantially obviates one or more of the problems caused by the limitations and disadvantages of the related art It is another and more specific object of the present invention to provide an apparatus that can attend to remote outputting of data received via email in an environment suitable for use by a large number of unidentified users.

In order to achieve the above objects according to the present invention, an apparatus includes a communication unit which receives email through a communication line, the email having been sent by a user and including a first identifier and data. The apparatus further includes an accumulation unit which stores therein the data, a printout unit, an input unit which receives a second identifier entered by the user through direct operation thereof, and a control unit which controls the printout unit to print the data corresponding to the first identifier by reading the data from the accumulation unit if the second identifier matches the first identifier.

According to the apparatus described above, the user who does not have a printer of his/her own, for example, can print the printout data by simply sending email to the apparatus situated at a desired location. Since the apparatus produces the printout only after the user enters an identifier such as his/her email address, the printout is not accessible by anyone else. Further, the identifier is based on information included in the email, so that there is no need to register a personal identification number, a password, or the like in advance. This is suitable for an environment in which a large number of unidentified users share use of the printer. There is also no need to manage and control personal identification numbers, passwords, or the like in the apparatus.

According to another aspect of the present invention, the apparatus as described above is such that the communication unit receives by email a transfer identifier including the first identifier and a transfer destination email address, and the control unit reads the data corresponding to the first identifier included in the transfer identifier from the accumulation unit, followed by transferring the read data to the transfer destination email address.

According to the apparatus described above, when the user mistakenly sends email to an output terminal situated at a location B despite his/her intention to send email to an output terminal provided at a location A, the user can send the transfer identifier from the output terminal at the location A to the output terminal at the location B, thereby having the printout data transferred from the output terminal at the location B to the output terminal at the location A.

According to another aspect of the present invention, the apparatus as described above is such that the control unit controls the printout unit according to instructions of a processing instruction text, and transfers the data and the processing instruction text to another apparatus identical to the afore-mentioned apparatus if the email includes the processing instruction text.

According to the apparatus described above, a plurality of apparatuses can attend to respective processing specified for each apparatus simply by sending a single email message including the printout data and the processing instruction text. Each apparatus attends to printing processing and data transfer processing in accordance with instructions and data transfer destinations specified in the processing instruction text.

According to another aspect of the present invention, an apparatus includes a communication unit which receives email through a communication line, the email having been sent by a user and including data, an accumulation unit which stores therein the data, a printout unit, an input unit which receives a first identifier entered by the user through direct operation thereof, and a control unit which generates a second identifier corresponding to the data, and sends the second identifier to the user by email via the communication unit, the control unit controlling the printout unit to print the data corresponding to the second identifier by reading the data from the accumulation unit if the first identifier matches the second identifier.

The apparatus described above generates an identifier upon reception of the data, and sends the generated identifier to the user. The user enters the received identifier into the apparatus to have the data printed. This can heighten security without imposing the burden on the user. Further, if the identifier generated by the apparatus is a numerical value comprised of a small number of digits, for example, the burden on the user in entering the identifier can be reduced.

Other objects and further features of the present invention will be apparent from the following detailed description when read in conjunction with the accompanying drawings.

BRIEF DESCRIPTION OF THE DRAWINGS

FIG. 9 shows an example of copyright information;

FIG. 22 is an illustrative drawing showing an example of a processing instruction text;

FIG. 23 is an illustrative drawing showing an example of a processing instruction text based on use of abbreviations;

FIG. 24 is an illustrative drawing showing an example of a record that stores an unabbreviated address corresponding to an abbreviated address;

FIG. 25 is an illustrative drawing showing an example of a wrong processing instruction text;

FIG. 26 is an illustrative drawing showing an example of a processing instruction text that has all transfer addresses therein collectively specified;

FIG. 27 is an illustrative drawing showing an example of a record that stores addresses of different communication lines;

FIG. 30 is a flowchart of data accumulation operation according to the embodiment of FIG. 29.

DESCRIPTION OF THE PREFERRED EMBODIMENTS

In the following, the principle and embodiments of the present invention will be described with reference to the accompanying drawings.

Figure 1:
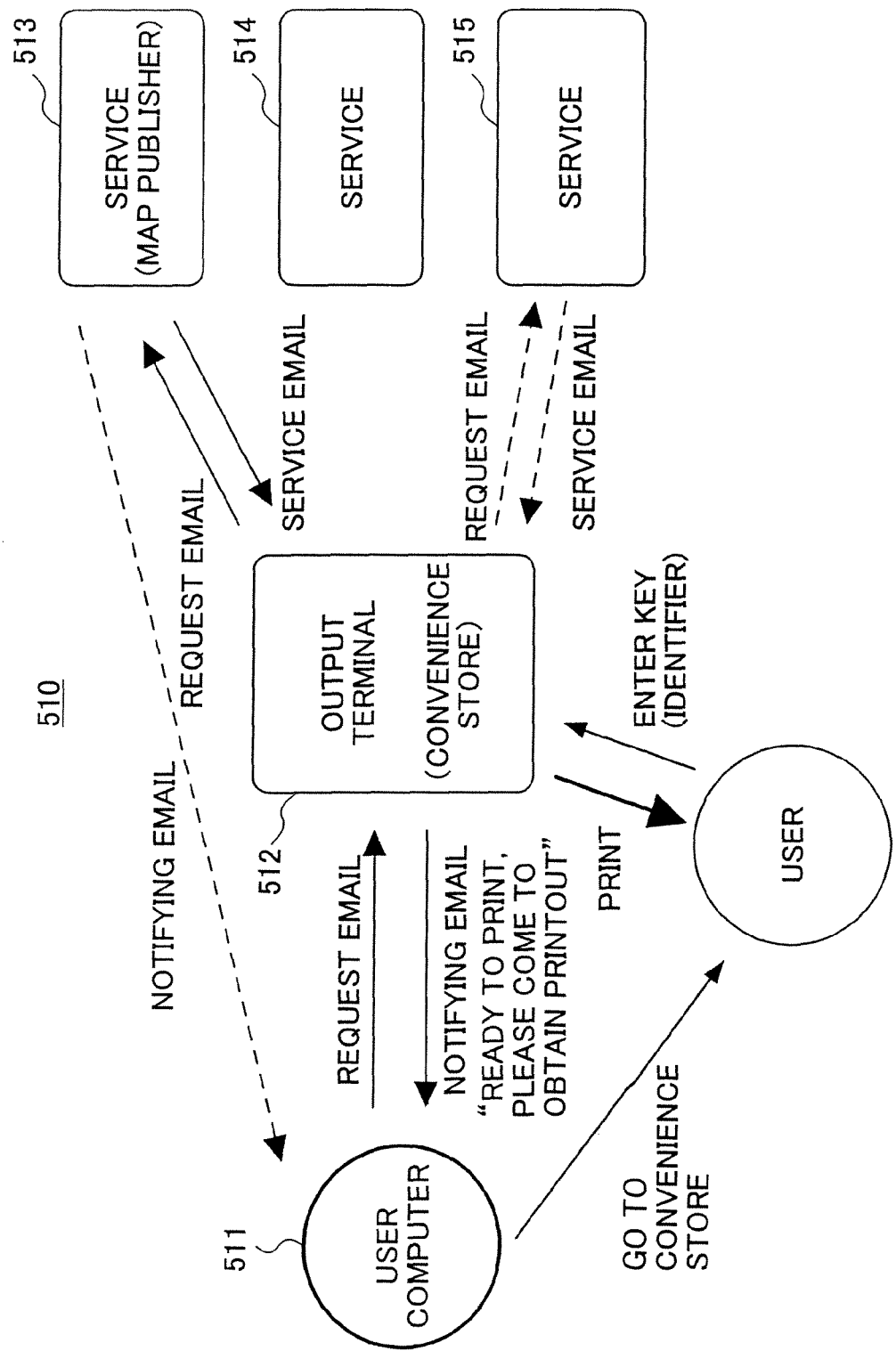
FIG. 1 is an illustrative drawing for explaining the principle of the present invention.

FIG. 1 is an illustrative drawing for explaining the principle of the present invention.

The system of FIG. 1 according to the present invention includes a user computer 511, an output terminal 512, and service provider servers 513 through 515, all of which are connected via a network such as the Internet. The user computer 511 may be a personal computer or the like that a user uses at his/her home or office. The output terminal 512 may be a dedicated output terminal provided with a printing function and a communication function and possibly with an additional copier function, or a printer system that is comprised of a computer and a printer apparatus connected together. The output terminal 512 may be installed at a large number of locations easily accessible by users such as convenience stores. The service provider servers 513 through 515 provide services to the users such as delivery of image information, audio information, video information, and the like.

The user of the user computer 511 may not be in the possession of his/her own printer, or may want to use a function (such as a color printing function) that is absent in his/her own printer. In other circumstances, the user may want have a printout with better quality that is not achievable by his/her own printer. In such cases, the user creates an email message that includes printout data and a printout request, and transmits the email to the output terminal 512 from the user computer 511. The output terminal 512 receives the email including the printout data and the printout request, and, in response, notifies the sender by email that the mail has been received and ready to be printed.

Having received the notifying email, the user goes to a location such as a convenient store where the output terminal 512 is installed, and enters an identifier into the output terminal 512. The identifier (identification information) is based on information included in the email transmitted by the user from the user computer 511 to the output terminal 512, and may be an email address or the like. When an email address is used as an identifier, the user enters his/her email address by directly operating the output terminal 512. In response, the output terminal 512 prints the printout data corresponding to the entered email address.

The identification information can be any type of information included in or derived from the received email, and numerous variations are conceivable. For example, a specific character string included in the email text may be used as a means to identify the identification information. If a character line starting with the character string "Identifier=" may be used as an indication of an identifier, for example, the identifier "taro@company.com" may be extracted from the character line "Identifier=taro@company.com". By the same token, the identifier "9758" may be extracted from the character line "Identifier=9758".

In the manner as described above, a user who does not own a printer can print the printout data by sending email to the output terminal 512 situated at a convenient location. In this case, the output terminal 512 outputs the printouts only after the user enters his/her identification information such as the email address, thereby preventing anyone else to access the printouts. Since the identification information is based on information included in the email, there is no need to register passwords, personal identification numbers, or the like in advance. This configuration is thus suitable for shared use of a printer by a large number of unidentified users. Further, there is no need for the output terminal 512 to allocate part of its resources to management and control of the passwords or personal identification numbers.

The printout request described above may be a request for printing printout data provided by the service provider servers 513 through 515, rather than a request for printing printout data included in the email that the user has sent. For example, the service provider server 513 may be operated by a publisher of maps. The user of the user computer 511 may send a request for delivery of printout data of a desired map by sending email to the service provider servers 513 through 515 via the Internet. Upon receiving the email requesting delivery of data, the service provider server 513 transmits the data of the requested map and identification information indicative of the user to the output terminal 512 by email. Further, the service provider server 513 notifies the user of the user computer 511 by email that the printout data has been delivered to the output terminal 512 and is ready to be printed.

Having received the notifying email, the user goes to a location such as a convenient store where the output terminal 512 is installed, and enters an identifier into the output terminal 512. When an email address is used as an identifier, for example, the user enters his/her email address by directly operating the output terminal 512. In response, the output terminal 512 prints the printout data corresponding to the entered email address.

The print request directed to the service provider servers 513 through 515 may be made by a user operating the output terminal 512 rather than made by the user computer 511. With provision of such a function, the user may prepare documents in the server of his/her own company, and be able to print the documents via the Internet at an output terminal close to the place where the user is visiting on a business trip or close to a place of a client, thereby eliminating a need to carry the large amount of paper documents.

In the description provided above, the printout data is output by a printing apparatus such as a printer. Data to be output, however, is not limited to the printout data, and the type of output is not limited to the printout output. For example, musical digital data may be output as analog data in the form of a recorded cassette tape, or video digital data may be output as analog data as recorded videotape. Such digital data may be obtained from the service provider servers 513 through 515, for example, and are output as analog data. In this case, only the data of an analog format is in the user's possession, so that it is possible to protect copyrights by preventing circulation of digital data and an unrestricted number of high quality copies being made from the digital data.

Alternatively, the musical digital data delivered to the output terminal 512 may be played as audio output on the spot, or the video digital data delivered to the output terminal 512 may be played as video output on the spot.

Figure 2:
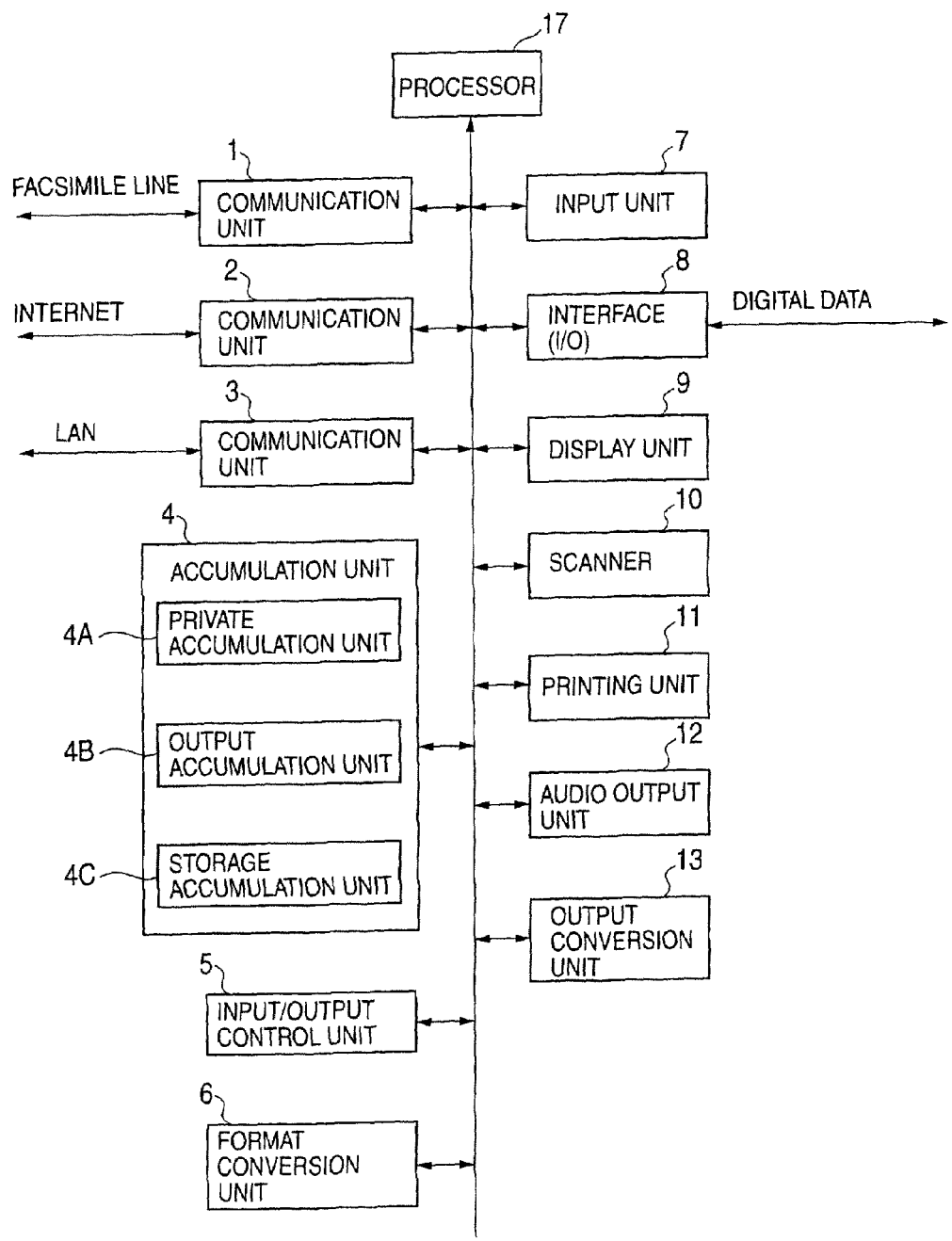
FIG. 2 is a block diagram of a first embodiment of an output terminal according to the present invention.
Figure 3:
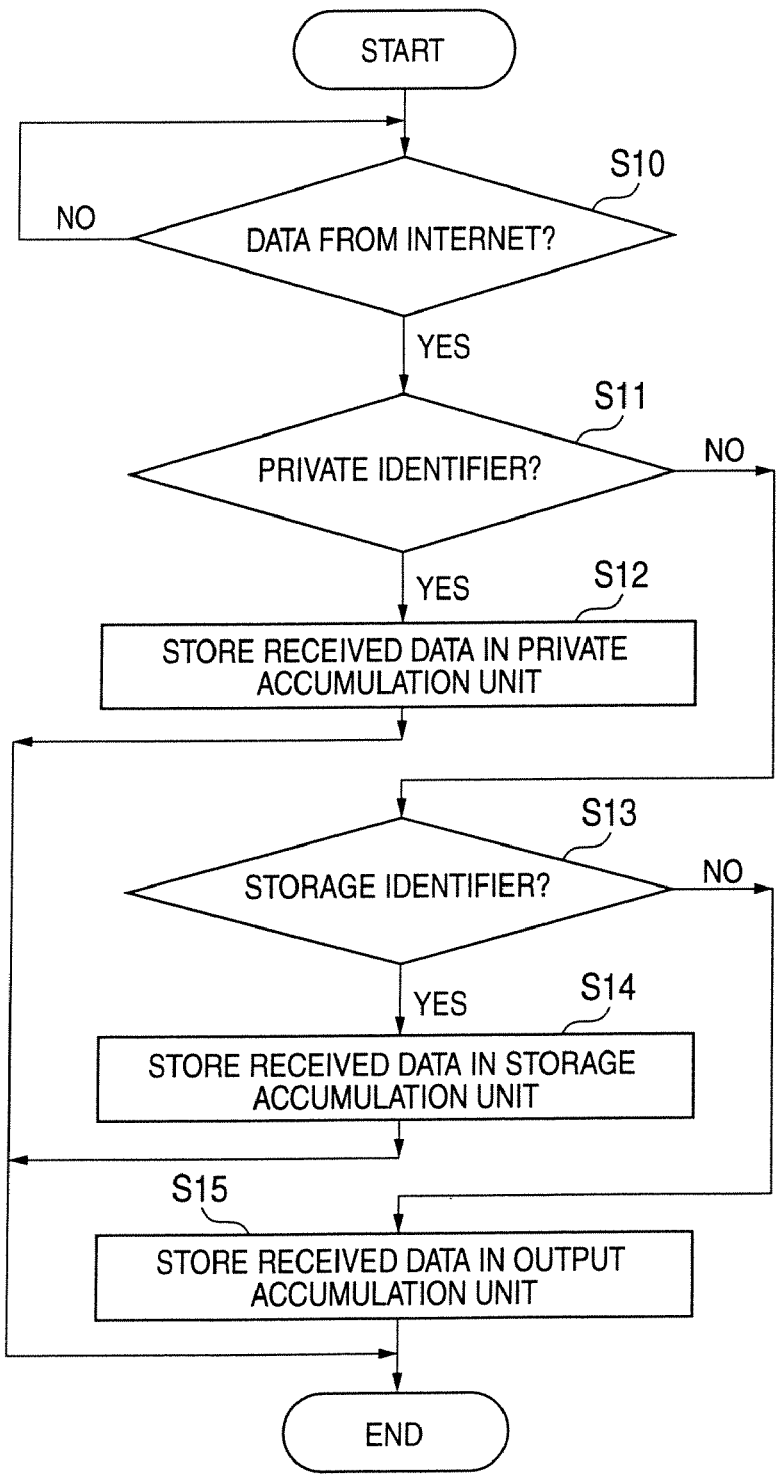
FIG. 3 is a flowchart of data accumulation operation according to the first embodiment.
Figure 4:
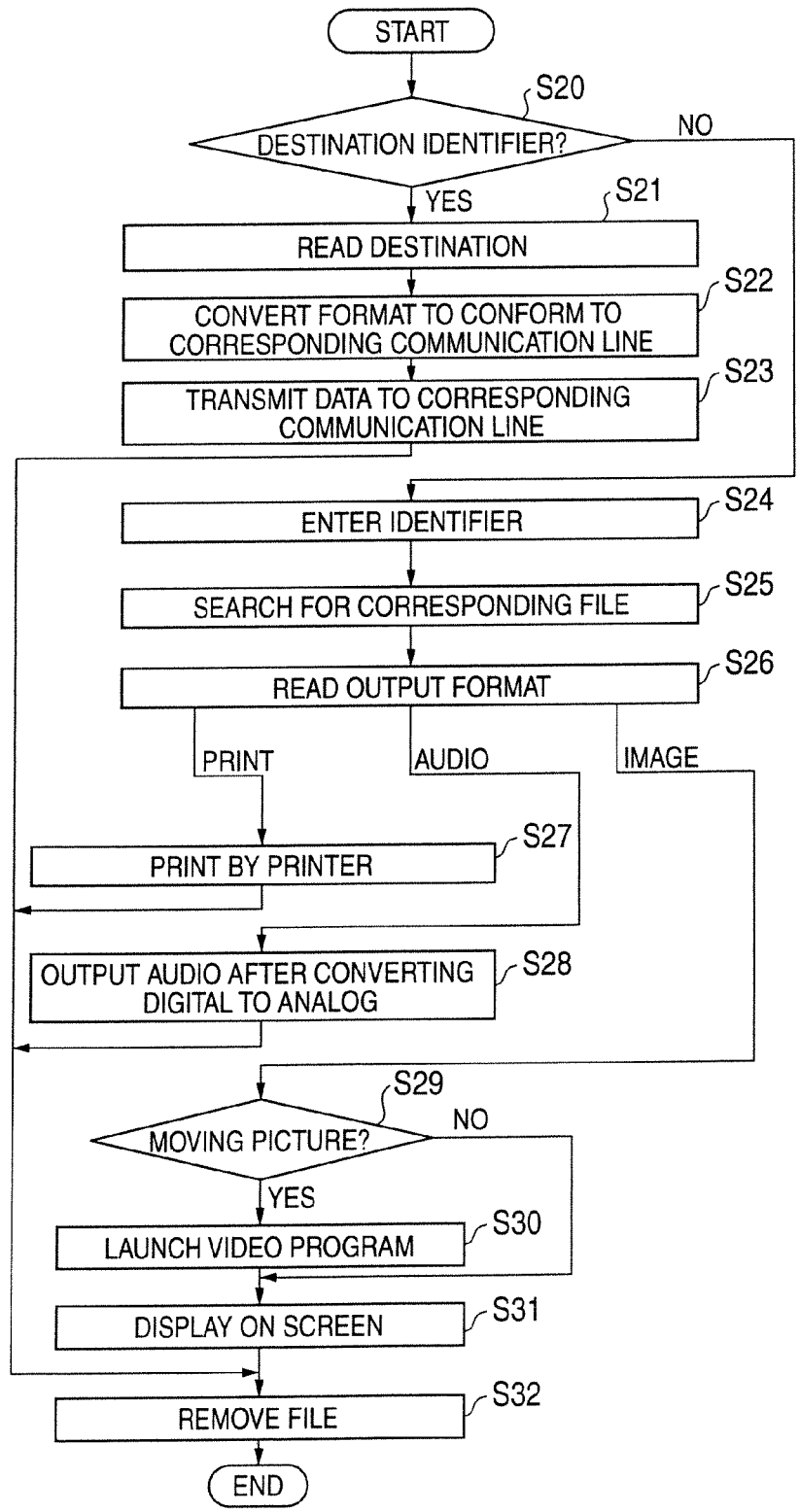
FIG. 4 is a flowchart of data output operation according to the first embodiment.

An embodiment of the present invention will be described with reference to FIG. 2 through FIG. 4. FIG. 2 is a block diagram of a first embodiment of the output terminal according to the present invention. FIG. 3 is a flowchart of data accumulation operation according to the first embodiment. FIG. 4 is a flowchart of data output operation according to the first embodiment.

The output terminal of FIG. 4 includes communication units 1 through 3, which are connected to the facsimile communication line, the Internet communication line, and the LAN communication line, respectively, to transmit and receive data to and from the corresponding communication line. The output terminal further includes an accumulation unit 4 comprised of a private accumulation unit 4A, an output accumulation unit 4B, and a storage accumulation unit 4C, each of which stores therein corresponding data. The output terminal further includes an input/output control unit 5, a format conversion unit 6, an input unit 7, an interface (I/O) 8 for inputting/outputting digital data, a display unit 9, a scanner 10, a printing unit 11, an audio output unit 12, an output conversion unit 13, and a processor 17 provided for processing purposes.

In the following, data accumulation operation in respect of the accumulation unit 4 will be described with reference to FIG. 3. FIG. 3 shows a case in which data is received from the Internet communication line connected to the communication unit 2.

At a step S10, the input/output control unit 5 checks whether the communication unit 2 has received incoming data, and waits until the check indicates reception of data.

At a step S11, the input/output control unit 5 checks whether the received data is provided with a private identifier. If the answer is affirmative, the procedure goes to a step S12. Here, the private identifier may be one of the source identifier indicative of a source of the incoming data and the destination identifier indicative of a destination of the incoming data, or may be a combination of both of these identifiers. Alternatively, the private identifier may be a password.

At the step S12, the input/output control unit 5 stores the received data in the private accumulation unit 4A.

If the check at the step S11 indicates absence of a private identifier, the procedure goes to a step S13, at which the input/output control unit 5 checks whether the received data is provided with a storage identifier. If the answer is affirmative, the procedure goes to a step S14, at which the received data is stored in the storage accumulation unit 4C. The storage accumulation unit 4C stores delivered digital documents when the digital documents are delivered from the service provider servers 513 through 515 shown in FIG. 1 so as to be printed by the output terminal 512, for example.

If the check at the step S13 indicates absence of a storage identifier, the procedure goes to a step S15. At the step S15, the input/output control unit 5 stores the received data in the output accumulation unit 4B.

The above description has been provided with reference to a case in which data is received via the Internet. In the case of facsimile transmission or LAN transmission, an identifier may be attached to the head of the transmission data, and the data is stored in the accumulation unit 4 in the same manner as was described with reference to FIG. 3.

Data input from the input unit 7, data input via the interface (I/O) 8, and data scanned by the scanner 10 may not be provided with any identifier. In such a case, the input unit 7 may be operated to enter an identifier prior to storage of the data, and the data is stored in the accumulation unit 4 in the same manner as was described with reference to FIG. 3.

In what follows, data output operation that outputs data from the accumulation unit 4 will be described with reference to FIG. 4. FIG. 4 is directed to the output operation that outputs data from the private accumulation unit 4A.

At a step S20, the input/output control unit 5 checks whether there is data having a destination identifier attached thereto as an identifier. If there is data having a destination identifier attached thereto, the destination is identified at a step S21.

At a step S22, the input/output control unit 5 determines which one of the facsimile communication line, the Internet communication line, and the LAN communication line corresponds to the identified destination, and instructs the format conversion unit 6 to convert the format of data read from the private accumulation unit 4A to conform to the format of the corresponding communication line.

At a step S23, the input/output control unit 5 controls the corresponding one of the communication units 1 through 3 to transmit the format-converted data.

If the check at the step S20 finds that there is no data having a destination identifier, the procedure goes to a step S24, at which the input unit 7 receives an identifier that is entered.

At a step S25, the input/output control unit 5 checks whether there is data having an identical identifier to the identifier entered at the step S24. If there is a matching identifier, the procedure goes to a step S26.

At the step S26, the input/output control unit 5 identifies the form of output conversion from the file. In the case of printing, the procedure goes to a step S27, at which the accumulated data is printed out from the printing unit 11.

If the printout data is that of facsimile transmission, the output conversion unit 13 attends to undoing of band compression, followed by printing by the printing unit 11. If the printout data is that of character code data, the output conversion unit 13 converts character codes into dot data, followed by printing by the printing unit 11.

If the output conversion identified at the step S26 corresponds to audio data, the procedure goes to a step S28. At the step S28, the output conversion unit 13 attends to undoing of band compression if the audio data has been subjected to band compression, and converts the data into analog data, which is then supplied to the audio output unit 12.

If the output conversion identified at the step S26 corresponds to image data, the procedure goes to a step S29. At the step S29, the input/output control unit 5 checks whether the data represents moving pictures. If the check gives an affirmative answer, the procedure goes to a step S30, at which a moving picture program is launched. At a step S31, the display unit 9 displays moving pictures or a still image, and, then, at a step S32, the file that has been output is removed.

Removal of a file is performed at an end of a predetermined time period after the data is read from the file. If the user wishes to take the output data with him/her, an analog record medium such as a magnetic tape may be connected to the interface (I/O) 8 to make an analog copy of the digital data.

As described above, files having destination identifiers attached thereto are automatically relayed, and other files are output only when the entered identifiers match the recorded identifiers serving as passwords. This protects security.

The above description has been provided with reference to a case in which the data accumulated in the private accumulation unit 4A is output. In the case of data accumulated in the output accumulation unit 4B, the input/output control unit 5 skips the steps S20 through S24 of FIG. 4, and automatically carries out the steps S25 through S32. Namely, digital data received by the output terminal is automatically printed, played as audio output, or played as vide output. This presents a problem in that strangers can access outputs in the case of printouts, for example. In this case, however, the user does not need to wait until the printing process is finished after requesting a printout at the location of the output terminal.

With respect to data accumulated in the storage accumulation unit 4C, the steps S20 through S23 are skipped, and an identifier is entered at the step S24, followed by performing the steps S25 through S32. When the identifier is to be entered at the step S24, identifiers of accumulated files may be shown on the display unit 9 to prompt user selection.

Displaying of identifiers for the purpose of prompting user selection makes it easier to play or print desired data. This is, however, viable only when the accumulated data is that of the public nature as opposed to the private nature.

The embodiment described above may assume a configuration in which the output terminal of the present invention is attached to or provided as part of a facsimile apparatus or the like. Alternatively, the output terminal of the present invention may be attached to or provided as part of a printer, a digital copier, or an integrated apparatus that is a combination of a digital copier, a printer, and a facsimile apparatus. Alternatively, the output terminal of the present invention may be attached to or provided as part of an information-processing apparatus such as a personal computer.

Figure 5:
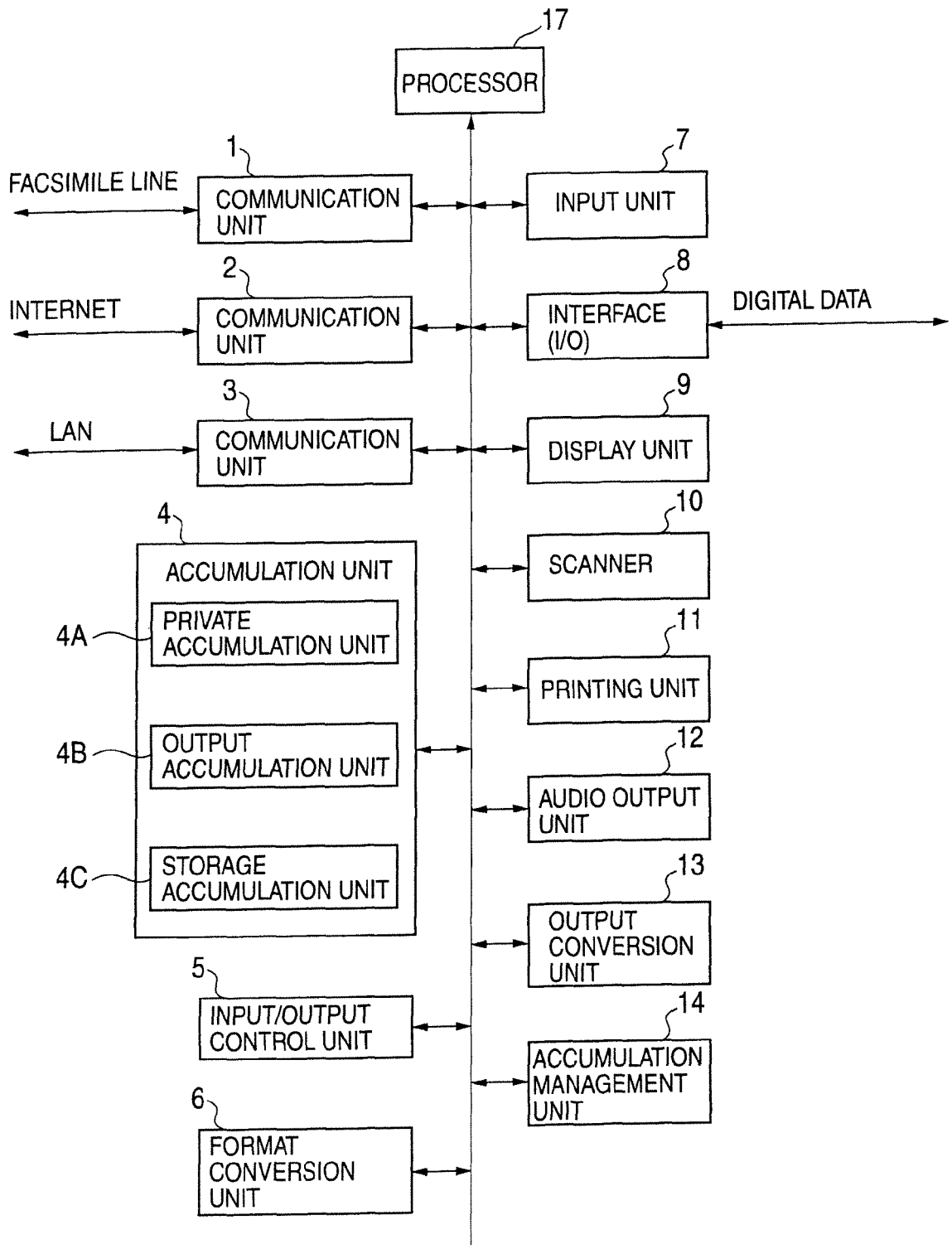
FIG. 5 is a block diagram of a second embodiment of an output terminal according to the present invention.
Figure 6:
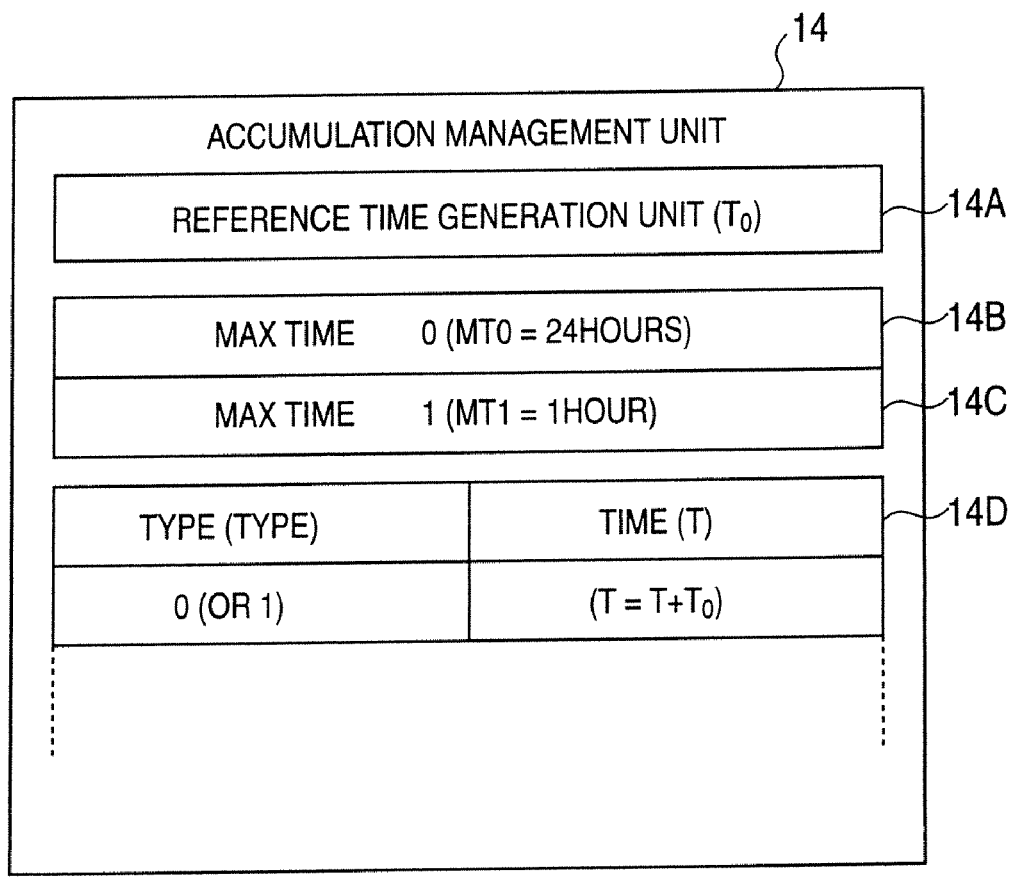
FIG. 6 is a block diagram of an accumulation management unit.
Figure 7:
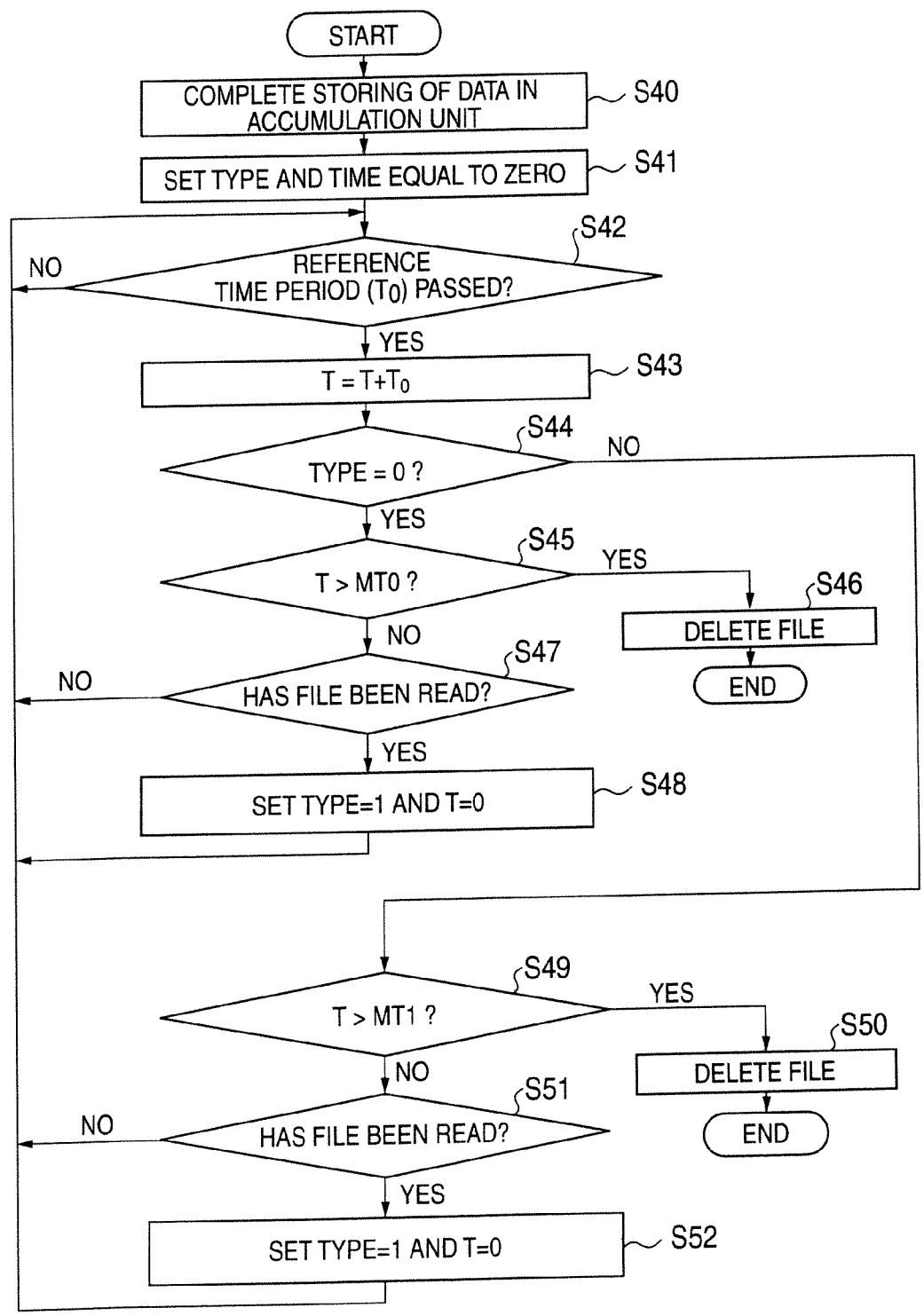
FIG. 7 is a flowchart of operation according to the second embodiment.

A second embodiment of the present invention will be described with reference to FIG. 5 through FIG. 7. FIG. 5 is a block diagram of a second embodiment of the output terminal according to the present invention. FIG. 6 is a block diagram of an accumulation management unit. FIG. 7 is a flowchart of operation according to the second embodiment.

In the second embodiment as shown in FIG. 5, an accumulation management unit 14 is newly provided in addition to the configuration of the first embodiment shown in FIG. 1.

In the second embodiment, data management is carried out with respect to data stored in the accumulation unit 4 described in the first embodiment.

As shown in FIG. 6, the accumulation management unit 14 newly provided includes a reference time generation unit 14A, a MAXTIME0 (MT0) recording unit 14B, a MAXTIME1 (MT1) recording unit 14C, and a TYPE & TIME recording unit 14D.

The MAXTIME0 recording unit 14B stores therein a time period MT0 (e.g., 24 hours) that passes from the storing of data to the removal of the data. The MAXTIME1 recording unit 14C stores therein a time period MT1 (e.g., 1 hour) that passes from the reading of data to the removal of the data. These time periods are input and modified by operating the input unit 7.

In the following, operation of the accumulation management unit 14 will be described with reference to the FIG. 7.

At a step S40, a check is made as to whether data accumulation in the accumulation unit 4 is completed. Upon completion, the procedure goes to a step S41, at which TYPE and T recorded in the TYPE & TIME recording unit 14D are set equal to zero with respect to the accumulated file.

At a step S42, the reference time generation unit 14A checks whether a reference time period $T_0$, e.g., 10 minutes, has passed. A standby state continues until the check gives an affirmative answer.

At a step S43, $T_0$ is added to the time T to update the time T stored in the TYPE & TIME recording unit 14D.

At a step S44, a check is made as to whether TYPE stored in the TYPE & TIME recording unit 14D is zero.

As will be described later, TYPE being zero indicates that the data has never been read from the accumulation unit 4, and TYPE being one indicates that the data has been read.

If the check at the step S44 gives an affirmative answer, the procedure goes to a step S45. At the step S45, a check is made as to whether the time T updated at the step S43 is greater than MT0 recorded in the MAXTIME0 recording unit 14B. If the check result is affirmative, the procedure goes to a step S46, at which the file is removed.

Namely, a file that has never been read for the time period of MT0 is removed.

If the check at the step S45 gives a negative answer, the procedure goes to a step S47. At the step S47, a check is made as to whether data has been read from the relevant file stored in the accumulation unit 4. If there has been no data reading, the procedure goes back to the step S42, and the steps S42 through S47 will be repeated.

If the check at the step S47 finds that the data has been read, the procedure goes to a step S48. At the step S48, TYPE and T recorded in the TYPE & TIME recording unit 14D are set equal to 1 and 0, respectively, followed by returning to the step S42 to repeat the steps S42 through S44.

If the check at the step S44 gives a negative answer to indicate that the data has been read from the file, the procedure goes to a step S49. At the step S49, a check is made as to whether the time T recorded in the TYPE & TIME recording unit 14D is greater than MT1 (e.g., 1 hour) recorded in the MAXTIME1 recording unit 14C. If the check result is affirmative, the procedure goes to a step S50, at which the file is removed.

Namely, a file that has been read is removed after the passage of the MT1 time period from the time of data reading.

If the check at the step S49 gives a negative answer, the procedure goes to a step S51, at which a check is made as to whether the file has been read again.

If the answer is negative, the procedure goes back to the step S42 to repeat the steps S42 through S44 and the steps S49 through S51.

If the check at the step S51 gives an affirmative answer, the procedure goes to a step S52. At the step S52, the time T recorded in the TYPE & TIME recording unit 14D is set equal to zero, followed by going back to the step S42 to repeat the steps S42 through S44 and the steps S49 through S52.

Namely, when data is read again from the file, the time period for deleting the file is extended.

In the embodiment described above, MT0 and MT1 stored in the respective MAXTIME0 recording unit 14B and MAXTIME1 recording unit 14C are entered through the input unit 7. Alternatively, either one of MT1 and MT2 or both MT1 and MT2 may be set in response to an available memory space remaining in the accumulation unit 4 by gauging such an available memory space.

Figure 10:
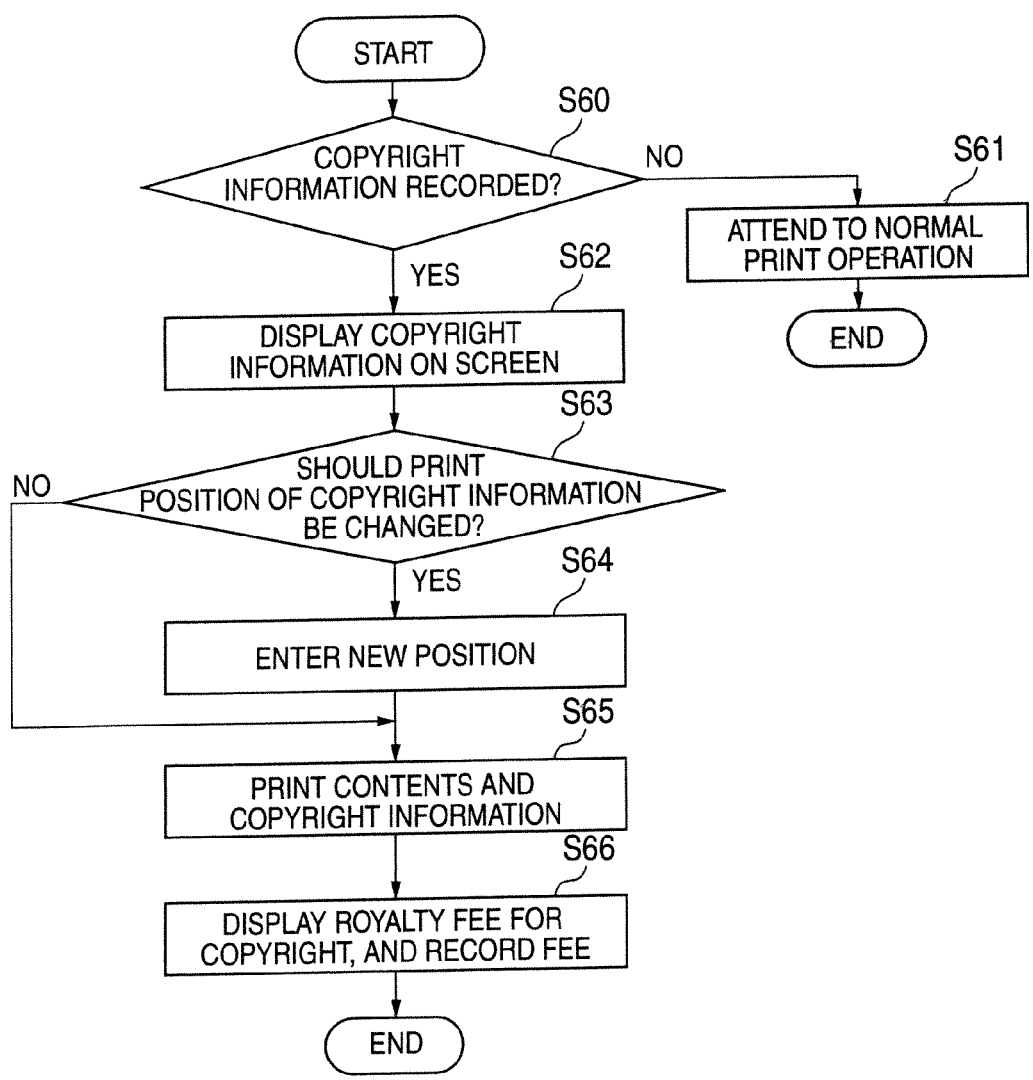
FIG. 10 is a flowchart of operation according to the third embodiment.

In the following, a third embodiment of the present invention will be described with reference to FIG. 8 through FIG. 10.

Figure 8:
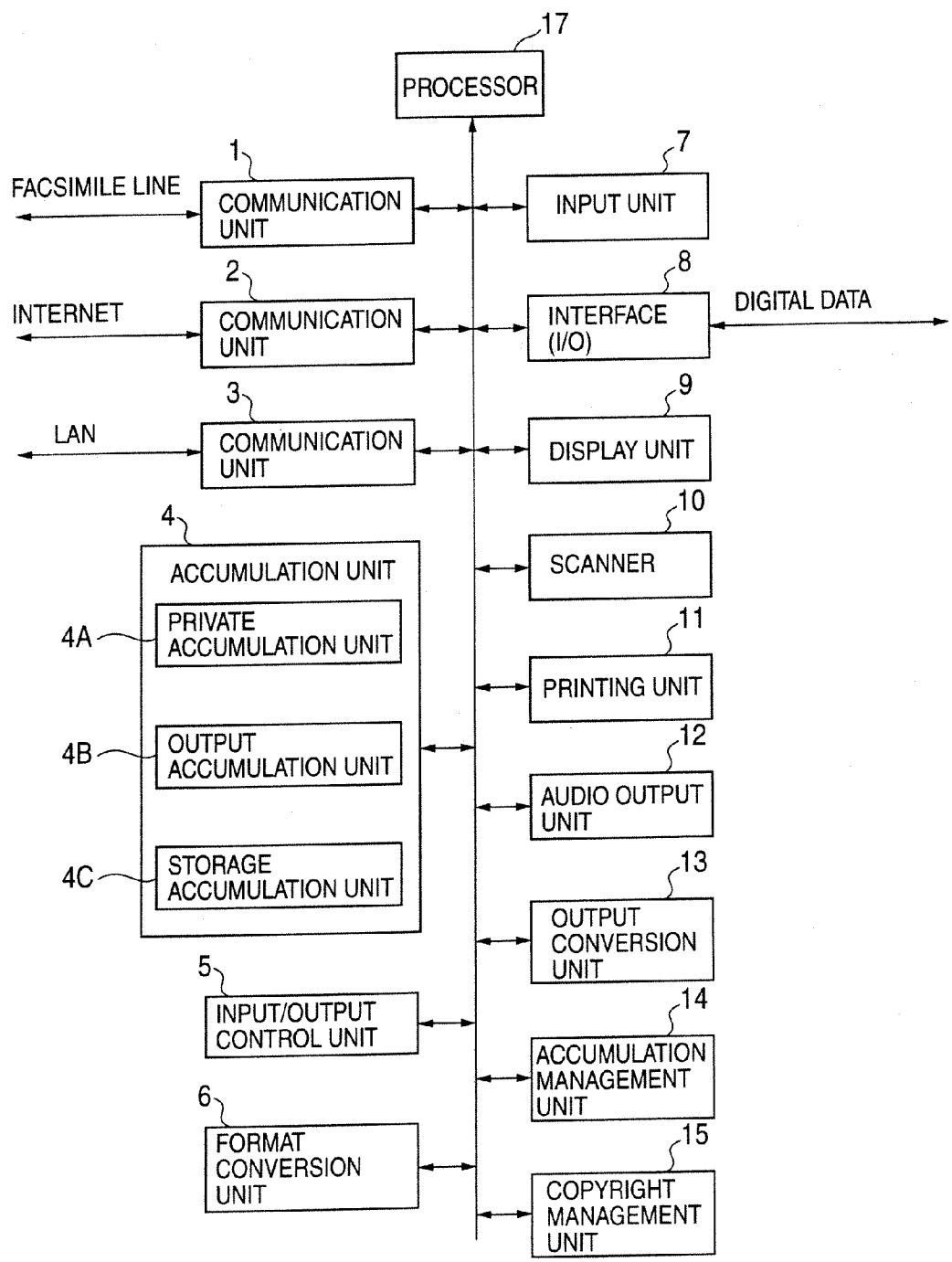
FIG. 8 is a block diagram of a third embodiment of an output terminal according to the present invention.

FIG. 8 is a block diagram of a third embodiment of the output terminal according to the present invention. FIG. 9 shows an example of copyright information. FIG. 10 is a flowchart of operation according to the third embodiment.

In the third embodiment as shown in FIG. 8, a copyright management unit 15 is newly provided in addition to the configuration of the second embodiment shown in FIG. 5.

In what follows, the operation of the third embodiment will be described with reference to FIG. 10.

At a step S60, the copyright management unit 15 checks whether data read from the accumulation unit 4 and to be printed by the printing unit 11 has copyright information attached thereto. If no copyright information is recorded, the procedure goes to a step S61 to perform a routine and normal printing operation.

If the check at the step S60 finds that copyright information is recorded, the procedure goes to a step S62, at which the copyright information is shown on the display unit 9.

As shown in FIG. 9, the copyright information includes "[CopyrightInfo]" indicative of presence of copyright record, "String" identifying a copyright holder and a year of copyright, "Price" indicative of a royalty for use of copyright, "POSCode" that is an item code readable by a Point-of-Sales terminal provided at a store where the output terminal of the present invention is located, and "Print" indicative of a print position where the copyright information and the indication of payment of royalty are printed.

At a step S63, a check is made as to whether the position specified by "Print" should be changed. If it should be changed, the procedure goes to a step S64, at which the input unit 7 is operated to change the position.

At a step s65, the printing unit 11 produces a printout with String, Price, and POSCode printed thereon at the position specified by "Print".

At a step S66, royalty for use of the copyright is displayed as specified by "Price", and the royalty fee is stored in memory.

Figure 11:
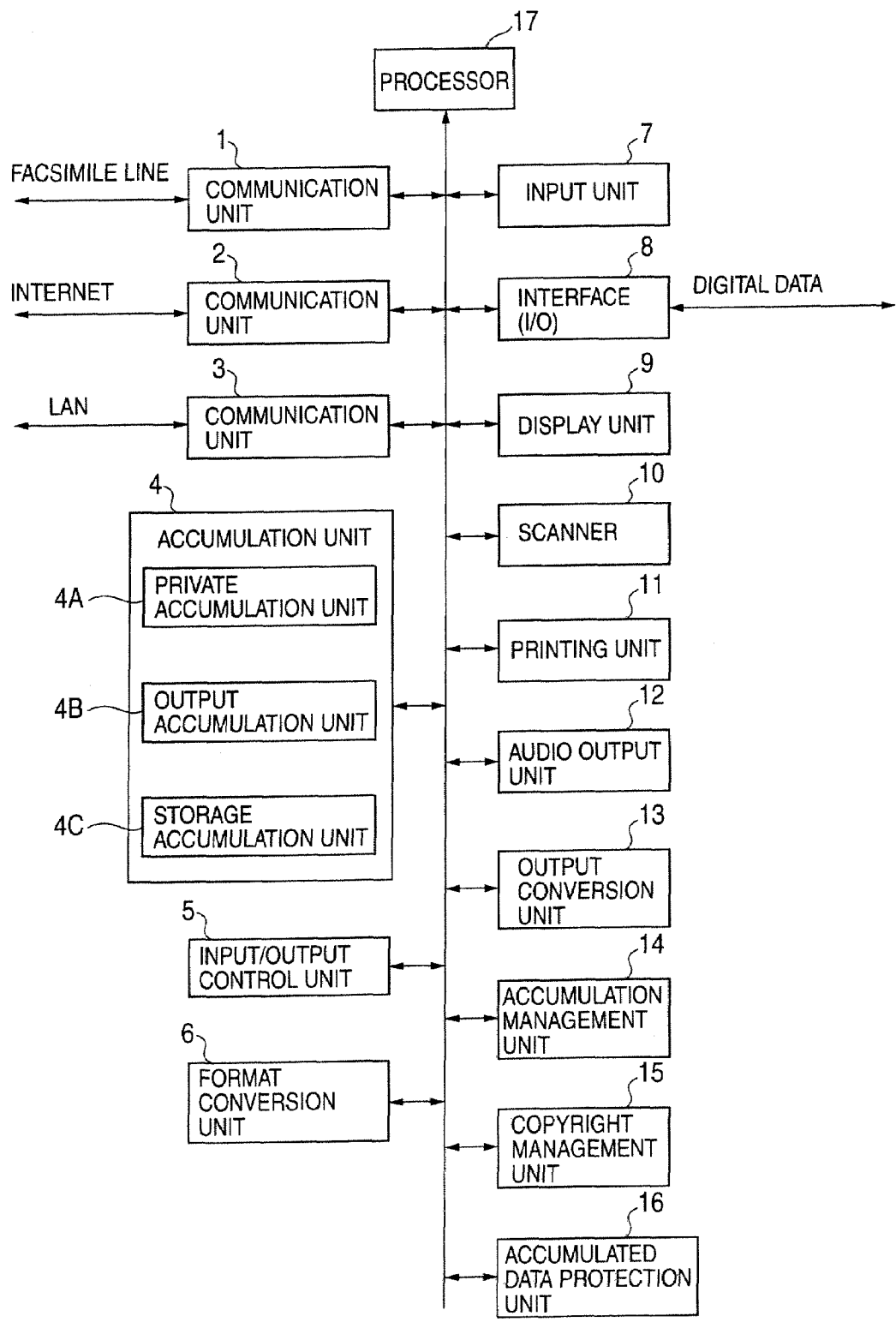
FIG. 11 is a block diagram of a fourth embodiment of an output terminal according to the present invention.
Figure 12:
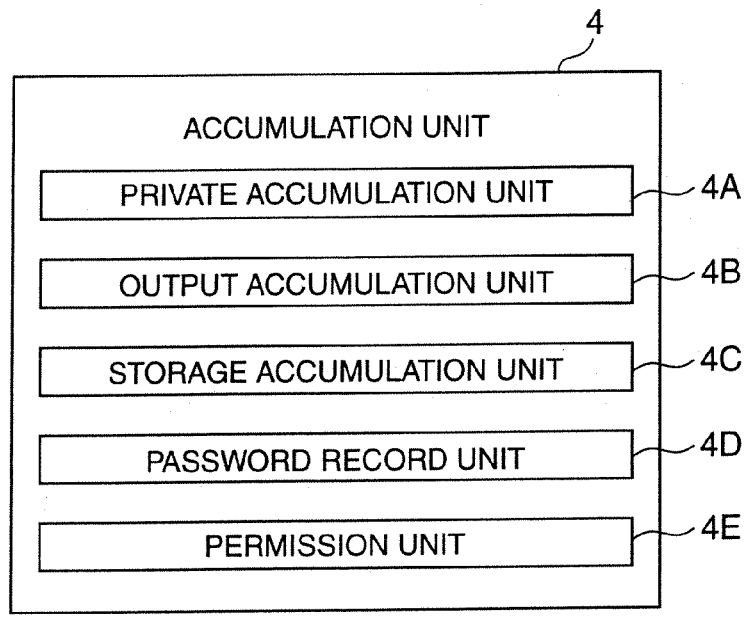
FIG. 12 is a block diagram of an accumulation unit of the fourth embodiment.
Figure 13:
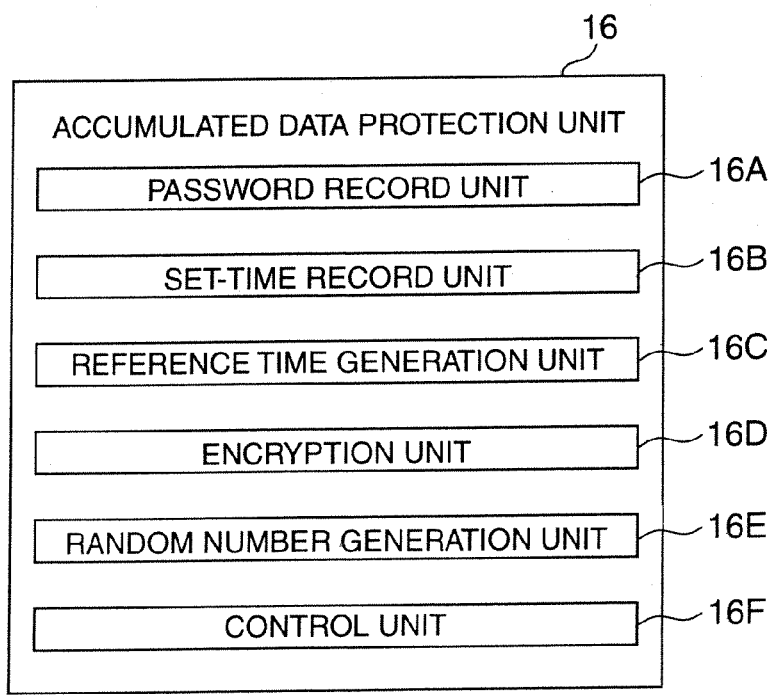
FIG. 13 is a block diagram of an accumulated data protection unit of the fourth embodiment.
Figure 14:
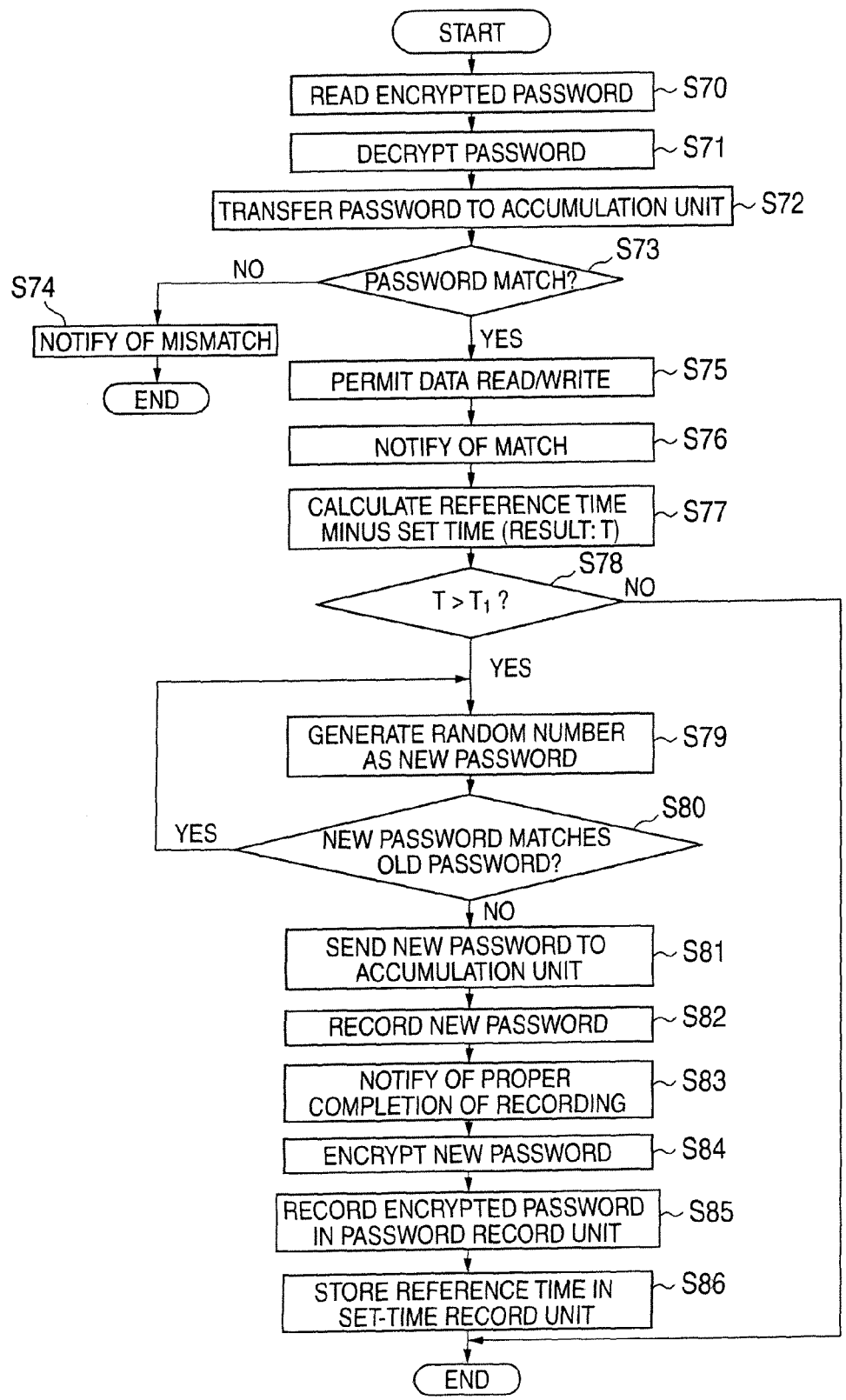
FIG. 14 is a flowchart of operation according to the fourth embodiment.

In the following, a fourth embodiment of the present invention will be described with reference to FIG. 11 through FIG. 14. FIG. 11 is a block diagram of a fourth embodiment of the output terminal according to the present invention. FIG. 12 is a block diagram of the accumulation unit 4 of the fourth embodiment. FIG. 13 is a block diagram of an accumulated data protection unit of the fourth embodiment. FIG. 14 is a flowchart of operation according to the fourth embodiment.

In the fourth embodiment as shown in FIG. 11, an accumulated data protection unit 16 is newly provided in addition to the configuration of the third embodiment shown in FIG. 8.

The accumulation unit 4 stores therein a large amount of data. This large amount of data needs to be securely protected even when power is cut off, so that the accumulation unit 4 is typically comprised of a hard drive or the like.

It is also required to protect the data stored in the accumulation unit 4 from being illegally accessed. Such illegal access may be attempted by disengaging the accumulation unit 4 from the output terminal.

The fourth embodiment is aimed at protecting data stored in the accumulation unit 4 from illegal access. To this end, the accumulation unit 4 is provided with a password record unit 4D and a permission unit 4E as shown in FIG. 12.

The password record unit 4D stores therein a password.

The permission unit 4E operates each time power is turned on, and compares a password supplied from the accumulated data protection unit 16 with a password recorded in the password record unit 4D. Only when these passwords match, does the permission unit 4E permit data reading and writing that will be subsequently performed.

The accumulated data protection unit 16, as shown in FIG. 14, includes a password record unit 16A, a set-time record unit 16B, a reference time generation unit 16C, an encryption unit 16D, a random number generation unit 16E, and a control unit 16F.

In the following, operation of the fourth embodiment will be described with reference to FIG. 14.

Here, the operation will be carried out each time the accumulation unit 4 is powered on.

At a step S70, the control unit 16F reads an encrypted password from the password record unit 16A. At a step S71, the encryption unit 16D decrypts the password. At a step S72, the password is transferred to the accumulation unit 4.

At a step S73, the permission unit 4E of the accumulation unit 4 checks whether the transferred password matches a password recorded in the password record unit 4D. If they do not match, the mismatch is reported to the accumulated data protection unit 16, with which the procedure comes to an end. If these passwords match, the procedure goes to a step S75, at which permission is given to data reading and writing that will be subsequently performed. At a step S76, then, the match of the passwords is reported to the accumulated data protection unit 16.

At a step S77, the control unit 16F of the accumulated data protection unit 16 derives a time difference T between the reference time generated by the reference time generation unit 16C and the time recorded in the set-time record unit 16B. At a step S78, a check is made as to whether the derived time difference T is greater than a predetermined time period $T_1$. If the check gives a negative answer, the procedure comes to an end.

If the check gives an affirmative answer, the procedure goes to a step S79, at which the random number generation unit 16E generates a random number to generate a new password. At a step S80, a check is made as to whether the new password matches the old password decrypted at the step S71. If they match, the procedure goes back to the step S79 to generate a new password again.

At a step S81, the control unit 16F transfers the new password to the accumulation unit 4.

At a step S82, the permission unit 4E records the transferred new password in the password record unit 4D. At a step S83, the accumulated data protection unit 16 is notified that the recording of the new password is properly completed.

At a step S84, the control unit 16F encrypts the new password by use of the encryption unit 16D in response to the notice. At a step S85, the encrypted password is stored in the password record unit 16A. At a step S86, the reference time generated by the reference time generation unit 16C is recorded in the set-time record unit 16B, with which the procedure comes to an end.

According to the present invention as described above, data transferred through communication lines of different data transfer schemes and input data are transferred to a designated destination or printed as printouts.

Further, the present invention can reduce cost and space for installation.

In the embodiments described above, the output terminal that prints the printout data, for example, is an output terminal to which the user sends email of a printout request. Accordingly, when the user mistakenly sends a printout request to an output terminal situated at a location B rather than to an output terminal situated at an intended location A, the user goes to the location A, finding that there is no printout data delivered to that location. If this happens within the same building of the company where the printout data intended to be delivered to the second floor is actually sent to the eighth floor, the user may be able to check the destination of the email after returning to his/her own computer, and, then, goes to the eighth floor to obtain the printout. If the user mistakenly sends email to a wrong convenience store, however, it would be too late for the user to realize his/her mistake after visiting the convenience store. In such a case, excessive time and labor would be necessary to cope with the mistake. In the following embodiments, a system that addresses such a mistake will be described.

Figure 15:
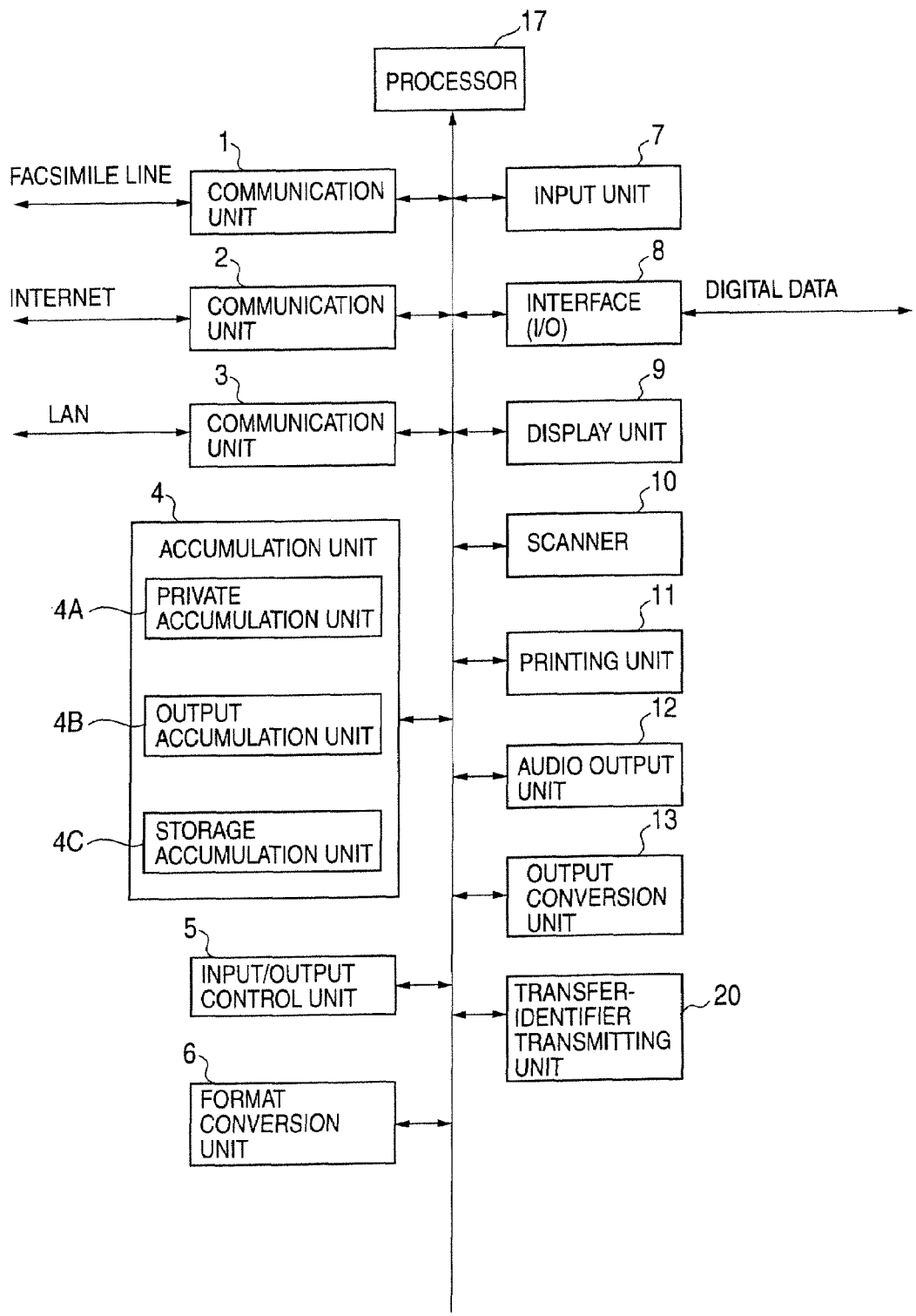
FIG. 15 is a block diagram of another embodiment of an output terminal according to the present invention.
Figure 16:
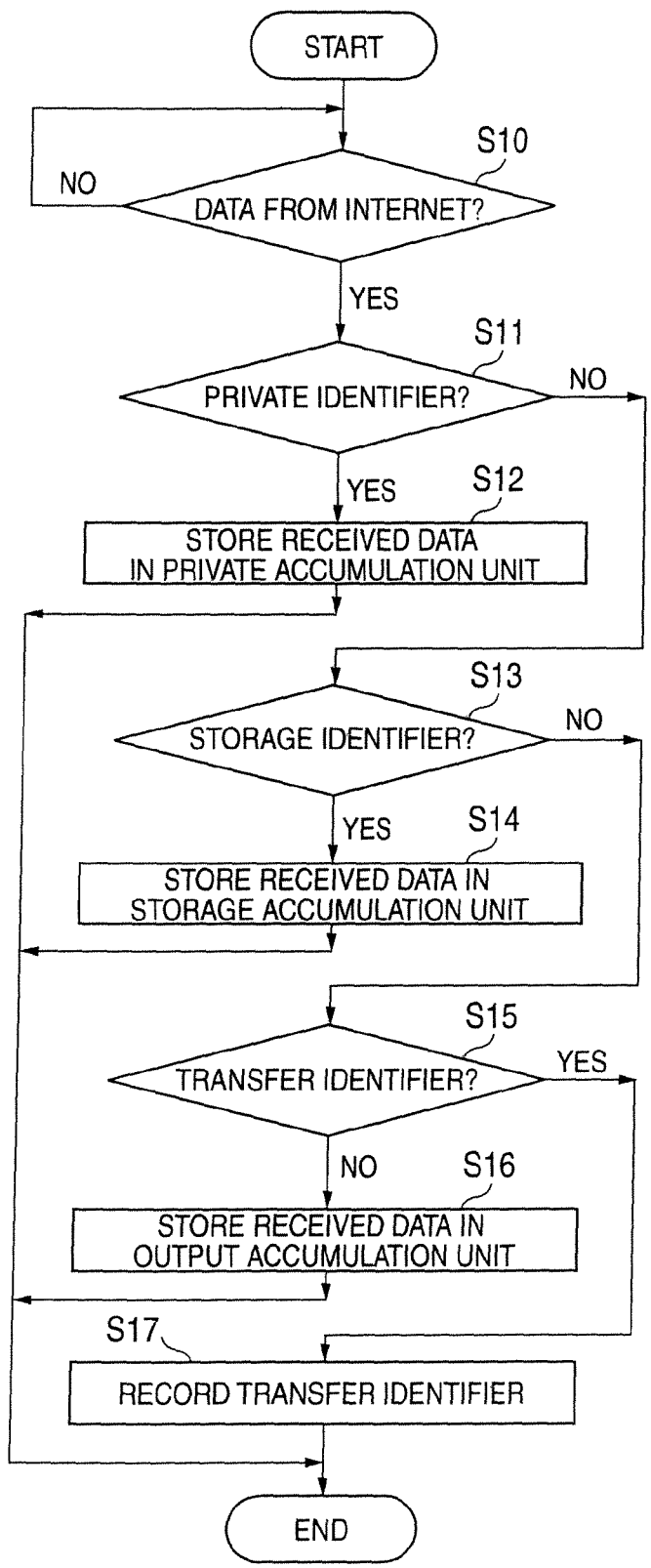
FIG. 16 is a flowchart of data accumulation operation according to the embodiment of FIG. 15.
Figure 17:
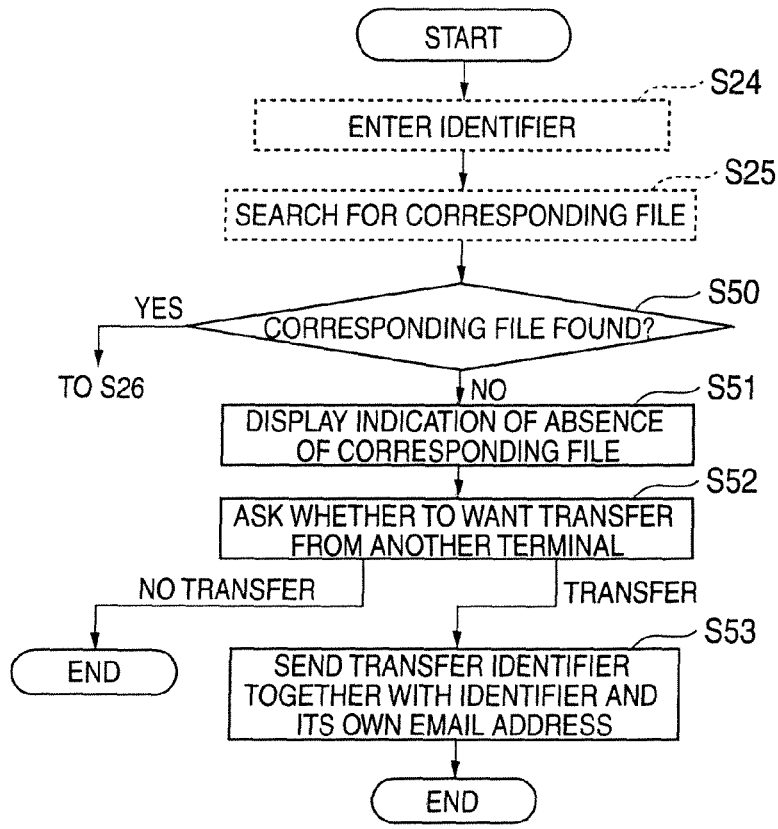
FIG. 17 is a flowchart of transfer operation.

A further embodiment of the present invention will be described with reference to FIG. 15 through FIG. 17. FIG. 15 is a block diagram of this embodiment of the output terminal according to the present invention. FIG. 16 is a flowchart of data accumulation operation according to the present embodiment. FIG. 17 is a flowchart of transfer operation.

The output terminal of FIG. 15 includes the communication units 1 through 3, which are connected to the facsimile communication line, the Internet communication line, and the LAN communication line, respectively, to transmit and receive data to and from the corresponding communication line. The output terminal further includes the accumulation unit 4 comprised of the private accumulation unit 4A, the output accumulation unit 4B, and the storage accumulation unit 4C, each of which stores therein corresponding data. The output terminal further includes the input/output control unit 5, the format conversion unit 6, the input unit 7, the interface (I/O) 8 for inputting/outputting digital data, the display unit 9, the scanner 10, the printing unit 11, the audio output unit 12, the output conversion unit 13, a transfer-identifier transmitting unit 20, and the processor 17 provided for processing purposes.

In the following, data accumulation operation in respect of the accumulation unit 4 will be described with reference to FIG. 16.

Here, FIG. 16 shows a case in which data is received from the Internet communication line connected to the communication unit 2.

At a step S10, the input/output control unit 5 checks whether the communication unit 2 has received incoming data, and waits until the check indicates reception of data.

At a step S11, the input/output control unit 5 checks whether the received data is provided with a private identifier. If the answer is affirmative, the procedure goes to a step S12.

Here, the private identifier may be one of the source identifier indicative of a source of the incoming data and the destination identifier indicative of a destination of the incoming data, or may be a combination of both of these identifiers. Alternatively, the private identifier may be a password.

At the step S12, the input/output control unit stores the received data in the private accumulation unit 4A.

If the check at the step S11 indicates absence of a private identifier, the procedure goes to a step S13, at which the input/output control unit 5 checks whether the received data is provided with a storage identifier. If the answer is affirmative, the procedure goes to a step S14, at which the received data is stored in the storage accumulation unit 4C.

If the check at the step S13 indicates absence of a storage identifier, the procedure goes to a step S15. At the step S15, the input/output control unit 5 checks whether the received data is a transfer identifier. If the check gives a negative answer, the procedure goes to a step S16, at which the received data is stored in the output accumulation unit 4B. If the answer of the check at the step S15 is affirmative, the procedure goes to a step S17, at which the received transfer identifier is stored in memory.

The above description has been provided with reference to a case in which data is received via the Internet. In the case of facsimile transmission or LAN transmission, an identifier may be attached to the head of the transmission data, and the data is stored in the accumulation unit 4 in the same manner as was described with reference to FIG. 16.

Data input from the input unit 7, data input via the interface (I/O) 8, and data scanned by the scanner 10 may not be provided with any identifier. In such a case, the input unit 7 may be operated to enter an identifier prior to storage of the data, and the data is stored in the accumulation unit 4 in the same manner as was described with reference to FIG. 16.

Operation for outputting data from the accumulation unit 4, i.e., outputting data from the private accumulation unit 4A, outputting data from the output accumulation unit 4B, and outputting data from the storage accumulation unit 4C, is the same as in the first embodiment previously described, and a duplicate description thereof will be omitted.

In what follows, operation of the transfer-identifier transmitting unit 20 will be described with reference to FIG. 17.

As was described in association with the first embodiment, the user enters his/her identifier by operating the input unit 7, and, then, a file corresponding to the entered identifier is searched for in the private accumulation unit 4A so as to be output.

If the data is sent to another output terminal by mistake, the user cannot obtain a printout from the output terminal that the user is operating.

To cope with such a situation, the transfer-identifier transmitting unit 20 automatically transmits a transfer identifier in order to have data transferred from another output terminal to the output terminal being operated.

At a step S24 of FIG. 17 (corresponding to the step S24 of FIG. 4), an identifier is entered. At a step S25 (corresponding to the step S25 of FIG. 4), a corresponding file is searched for in the private accumulation unit 4A. The procedure then goes to a step S50.

At the step S50, the transfer-identifier transmitting unit 20 checks whether a corresponding file is found at the step S25. If it is found, the procedure goes to the step S26 of FIG. 4, and the steps S26 through S32 will be performed as was described with reference to FIG. 4.

If the check at the step S50 finds that there is no corresponding file, the procedure goes to a step S51, at which the absence of the corresponding file is indicated on the display unit 9. At a step S52, then, the user is asked on the screen whether the data should be transferred from another output terminal.

If the user enters "no transfer" into the input unit 7 in response, the procedure comes to an end.

If the user enters "transfer", the procedure goes to a step S53. At the step S53, a transfer identifier is transmitted to the Internet, for example, together with the identifier entered at the step S24 and an address of the output terminal serving as an indication of a correct destination of file transfer.

In doing so, the transfer identifier may be transmitted to all addresses that are registered in advance. In the office environment, for example, addresses of all the output terminals installed in the office may be registered in advance.

If it is desired that the data transferred from another output terminal responding to the transfer identifier is immediately printed by the printing unit 11, the transferred data should be stored in the output accumulation unit 4B as was previously described. To this end, an instruction requiring that the transfer data should not have a private identifier nor a storage identifier attached thereto may be further attached to the transfer identifier together with the entered identifier and the address of the output terminal serving as a correct destination. When the transferred data is provided with neither a private identifier nor a storage identifier, as was described with reference to FIG. 16, the transferred data is stored in the output accumulation unit 4B so as to be immediately output as a printout.

In this embodiment, the transfer identifier is sent out from the output terminal. Alternatively, the transfer identifier can be sent out from any apparatus as long as the apparatus is so configured that the transfer identifier can be entered. Such apparatus may be a personal computer or the like connected to the communication units 1 through 3. As was described, the destination of data transfer is specified so as to have the relevant output terminal print a printout.

In the above embodiment, data transmitted to any given output terminal can be transferred to any output terminal to be output. In such a configuration, however, the transfer identifier needs to be sent to all the output terminals, thereby imposing the heavy load on output terminals and communication lines. Instead of such a configuration, only one output terminal may be announced as a destination of all email printout requests, for example. In such a case, the designated output terminal serves as a master device, which receives all the printout requests and printout data. Output terminals connected to the master device via the Internet may be installed as slave devices at convenience stores of a nationwide chain. Any one of the slave devices located nationwide may be used to obtain the printout data from the master device to output the data as a printout.

Operation that is performed in response to storing of a transfer identifier at the step S17 of FIG. 16 will be described with reference to FIG. 18.

When the transfer identifier is received, a corresponding file is transferred to the correct destination in accordance with the data attached to the transfer identifier. This operation will be described below.

As was described in connection with FIG. 17, data attached to the transfer identifier includes a correct destination and an identifier that identifies data stored in the accumulation unit 4.

Figure 18:
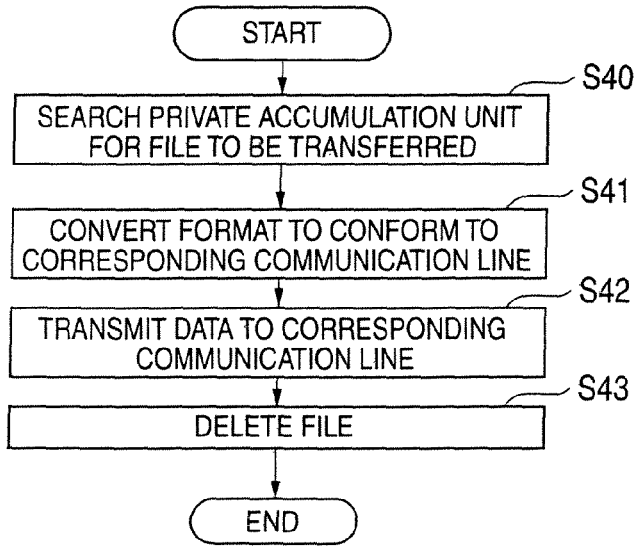
FIG. 18 is a flowchart of operation performed in response to storing of a transfer identifier.

In FIG. 18, transfer operation is started in response to reception of a transfer identifier by any one of the communication units 1 through 3. At a step S40, the input/output control unit 5 searches for an identifier identical to the identifier attached to the received transfer identifier where the search is conducted with respect to data stored in the private accumulation unit 4A.

At a step S41, if a corresponding file is found as a result of search, the format conversion unit 6 converts the data of the file into a format conforming to the communication line that is connected to the correct destination (i.e., transfer destination), which is specified in the data attached to the transfer identifier. At a step S42, the data is transmitted to the corresponding communication line via one of the communication units 1 through 3. At a step S43, the file of the transferred data is removed.

The embodiment described above may assume a configuration in which the output terminal of the present invention is attached to or provided as part of a facsimile apparatus or the like. Alternatively, the output terminal of the present invention may be attached to or provided as part of a printer, a digital copier, or an integrated apparatus that is a combination of a digital copier, a printer, and a facsimile apparatus. Alternatively, the output terminal of the present invention may be attached to or provided as part of an information-processing apparatus such as a personal computer.

According to the present invention as described above, data transferred through communication lines of different data transfer schemes and input data are transferred to a designated destination or printed as printouts.

Further, the present invention can reduce cost and space for installation.

Moreover, even when data is mistakenly stored in a wrong place, the data can be readily transferred to a remote correct destination.

In the embodiments described above, the printout data transmitted through email will be printed by the output terminal simply in accordance with a predetermined format. Because of this, it is not possible to reduce overall running cost by printing specific pages suitable for color appearance by a color printer and printing the remaining pages by a monochrome printer running at a low cost, for example. In a company-wide system, further, there may be a case in which main branch offices need all pages of a document to be printed whereas only specific pages of the document need to be delivered to other branch offices. In such a case, it is necessary to divide the digital document in advance and deliver selected pieces of the document to branch offices so as to send all the pages to the output terminals of the main branch offices and to send only the specific pages to the output terminals of the other branch offices.

In the following embodiment, a description will be provided with regard to a configuration in which various output terminals can print data in different printout formats only by sending single document data via a single email message.

Figure 19:
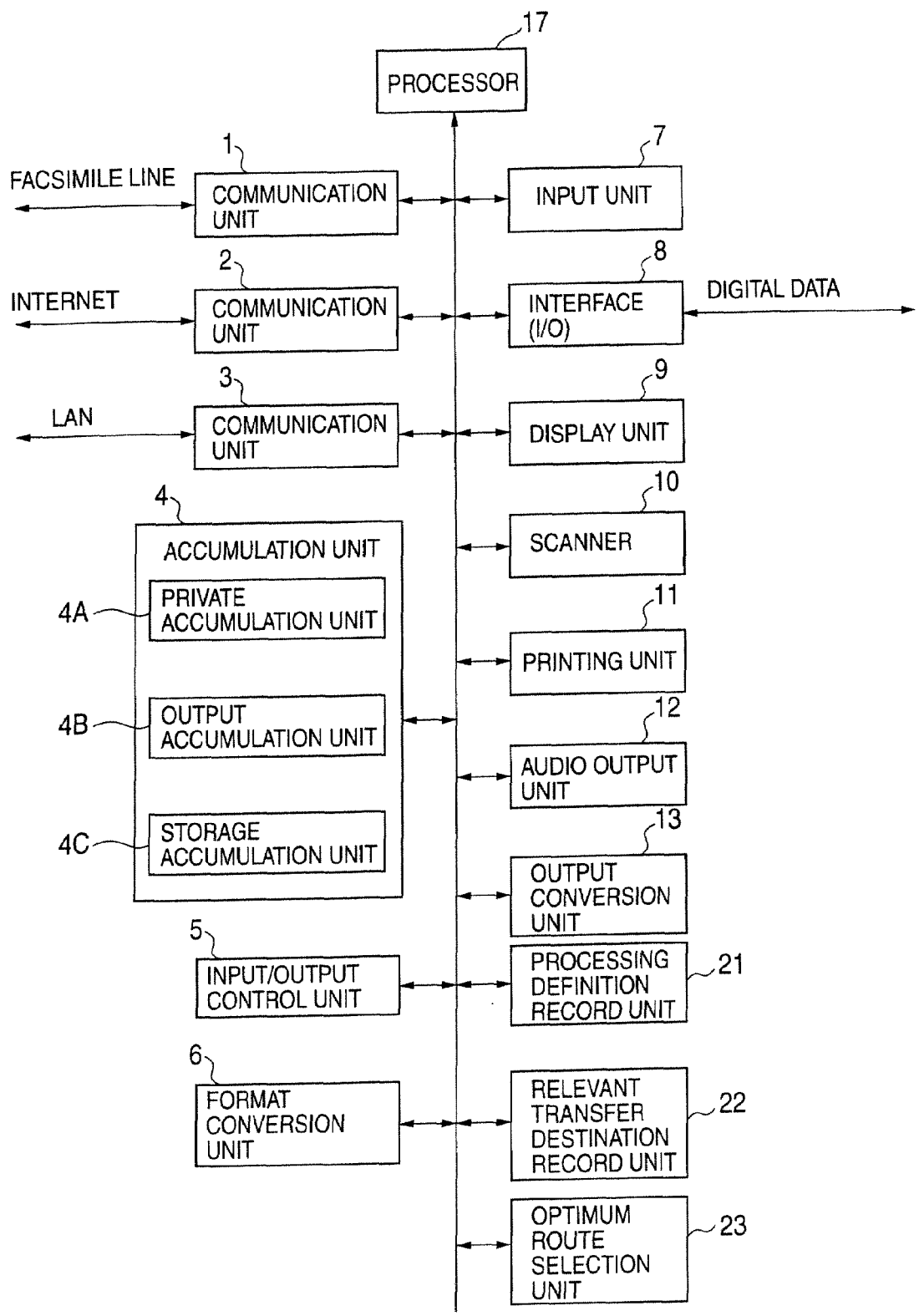
FIG. 19 is a block diagram of another embodiment of an output terminal according to the present invention.
Figure 20:
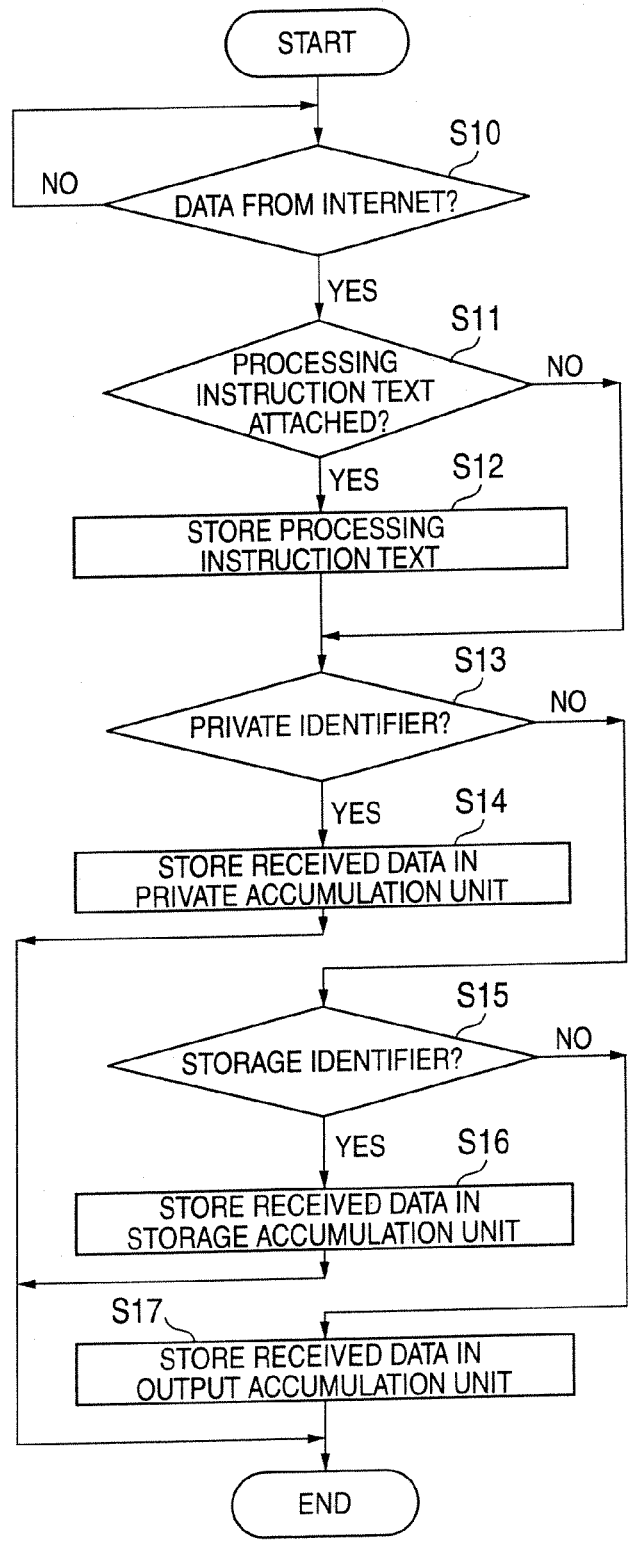
FIG. 20 is a flowchart of data accumulation operation according to the embodiment of FIG. 19.

A further embodiment of the present invention will be described with reference to FIG. 19 and FIG. 20. FIG. 19 is a block diagram of this embodiment of the output terminal according to the present invention. FIG. 20 is a flowchart of data accumulation operation according to the present embodiment.

The output terminal of FIG. 19 includes the communication units 1 through 3, which are connected to the facsimile communication line, the Internet communication line, and the LAN communication line, respectively, to transmit and receive data to and from the corresponding communication line. The output terminal further includes the accumulation unit 4 comprised of the private accumulation unit 4A, the output accumulation unit 4B, and the storage accumulation unit 4C, each of which stores therein corresponding data. The output terminal further includes the input/output control unit 5, the format conversion unit 6, the input unit 7, the interface (I/O) 8 for inputting/outputting digital data, the display unit 9, the scanner 10, the printing unit 11, the audio output unit 12, the output conversion unit 13, a processing definition record unit 21, a relevant transfer destination record unit 22, an optimum route selection unit 23, and the processor 17 provided for processing purposes.

In the following, data accumulation operation in respect of the accumulation unit 4 will be described with reference to FIG. 20.

Here, FIG. 20 shows a case in which data is received from the Internet communication line connected to the communication unit 2.

At a step S10, the input/output control unit 5 checks whether the communication unit 2 has received incoming data, and waits until the check indicates reception of data.

At a step S11, the input/output control unit 5 checks whether the received data has a processing instruction text attached thereto. If the check gives an affirmative answer, the procedure goes to a step S12, at which the processing instruction text is stored in memory.

At a step S13, the input/output control unit 5 checks whether the received data is provided with a private identifier. If the answer is affirmative, the procedure goes to a step S14. Here, the private identifier may be one of the source identifier indicative of a source of the incoming data and the destination identifier indicative of a destination of the incoming data, or may be a combination of both of these identifiers. Alternatively, the private identifier may be a password.

At the step S14, the input/output control unit 5 stores the received data in the private accumulation unit 4A.

If the check at the step S13 indicates absence of a private identifier, the procedure goes to a step S15, at which the input/output control unit 5 checks whether the received data is provided with a storage identifier. If the answer is affirmative, the procedure goes to a step S16, at which the received data is stored in the storage accumulation unit 4C.

If the check at the step S15 indicates absence of a storage identifier, the procedure goes to a step S17. At the step S17, the input/output control unit 5 stores the received data in the output accumulation unit 4B.

The above description has been provided with reference to a case in which data is received via the Internet. In the case of facsimile transmission or LAN transmission, an identifier may be attached to the head of the transmission data, and the data is stored in the accumulation unit 4 in the same manner as was described with reference to FIG. 20.

Data input from the input unit 7, data input via the interface (I/O) 8, and data scanned by the scanner 10 may not be provided with any identifier. In such a case, the input unit 7 may be operated to enter an identifier prior to storage of the data, and the data is stored in the accumulation unit 4 in the same manner as was described with reference to FIG. 20.

Operation for outputting data from the accumulation unit 4, i.e., outputting data from the private accumulation unit 4A, outputting data from the output accumulation unit 4B, and outputting data from the storage accumulation unit 4C, is the same as in the first embodiment previously described, and a duplicate description thereof will be omitted.

In what follows, a description will be provided with regard to a case in which a processing instruction text is recorded at the step S12 of FIG. 20.

Figure 21:
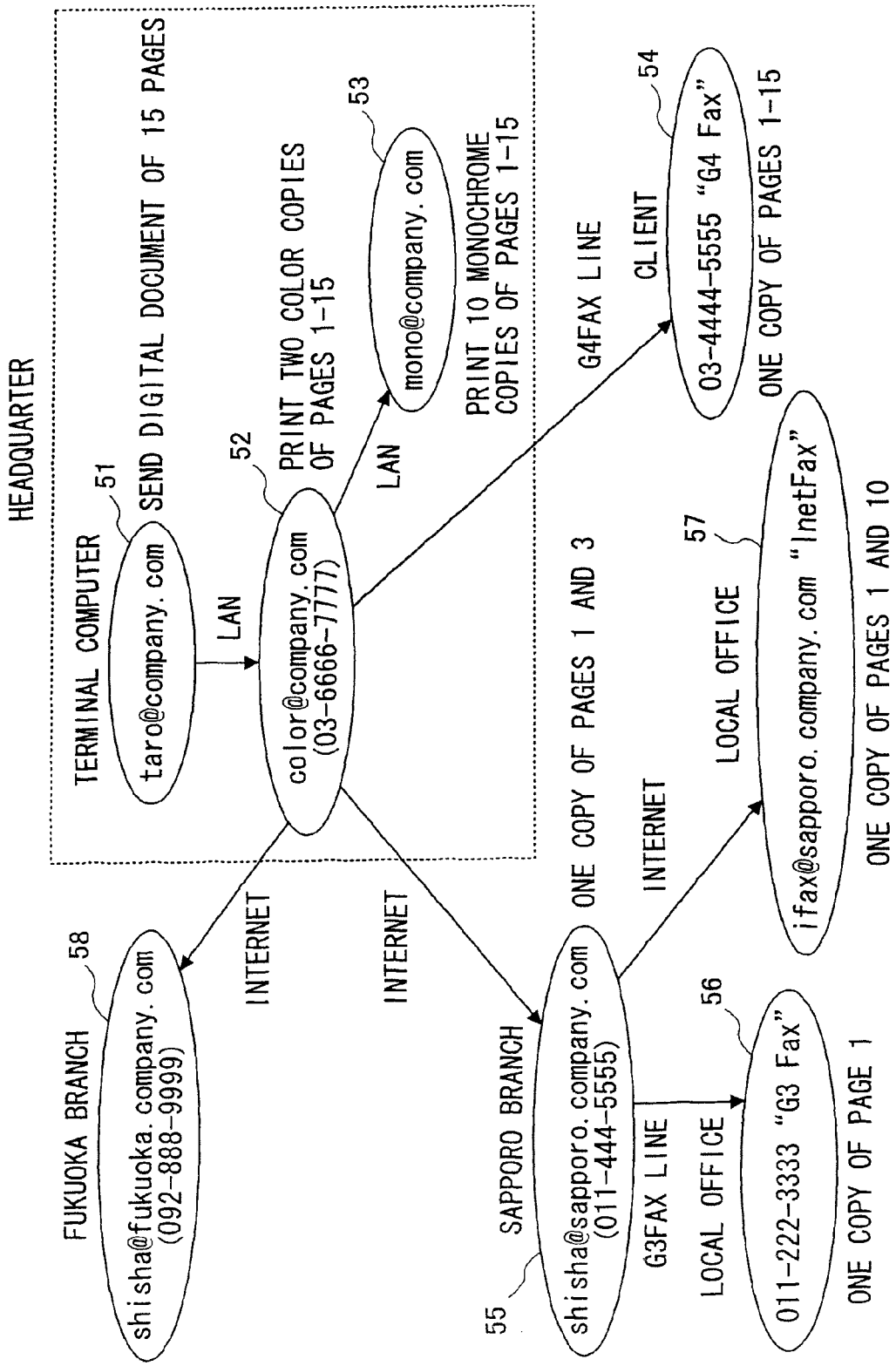
FIG. 21 is an illustrative drawing for explaining print and transfer operation based on a processing instruction text.

As shown in FIG. 21, a digital document comprised of a total of 15 pages is sent out from a terminal computer 51 of the headquarter office, with an aim of printing two copies of all the pages by using a color printer of an output terminal 52 located at the headquarter, printing ten copies of all the pages by using a monochrome printer of an output terminal 53 located at the headquarter, printing a copy of all the pages at an output terminal 54 of a client residing in Tokyo, printing a copy of pages 1 and 3 at an output terminal 55 of a Sapporo branch, printing a copy of page 1 at an output terminal 56 at a local office of the Sapporo branch, and printing a copy of pages 1 and 10 at an output terminal 57 at another local office of the Sapporo branch.

In such a case, the terminal computer 51 of the headquarter attaches as a file a processing instruction text as shown in FIG. 22 to the digital document data, and sends email to the output terminal 52 equipped with the color printer.

As shown in FIG. 22, the processing instruction text includes transfer addresses specified in the brackets "[ ]" as shown in lines 1, 5, 8, 11, and 18. "Print=" specified thereafter indicates pages and the number of copies to be printed. For example, "Print=(1–15)*2" means printing two copies of pages 1 through 15, and "Print=(1, 3)*1" means printing a copy of pages 1 and 3.

"Transfer=" following "Print=" specifies transfer addresses.

The output terminal 52 located at the headquarter receives the digital document and the processing instruction text as shown in FIG. 22 form the terminal computer 51, and checks the processing instruction text in search of a line that starts with a character string specifying its own email address in the brackets. In this example, line 1 starts with a character string that specifies its own email address in the brackets. processing defined from the line following line 1 to the line immediately before line 5 starting with another email address [monor@company.com] is to be performed by the output terminal 52. That is, processing defined from line 2 to line 3 is carried out by the output terminal 52. According to the instruction of line 2, the output terminal 32 uses its own color printer to print two copies of pages 1 through 15 of the digital document.

Also, the output terminal 52 transfers the processing instruction text and the digital document by email to monor@company.com specified after "Transfer=" at line 3. By the same token, the processing instruction text and the digital document are transferred by email to shisha@sapporo.company.com specified at the same line.

The last address 03-4444-5555 "G4Fax" specified at the same line indicates a facsimile transmission to G4FAX. In the case of email, transfer destinations can interpret the processing instruction text, but facsimile apparatuses cannot. There is thus a need to interpret the processing instruction text at the transmission end. Namely, a section of [03-4444-5555] is found at line 8 in the processing instruction document, and, then, "Print=(1–15)*1" at line 9 is interpreted, followed by transmitting the digital document via facsimile transmission in accordance with the interpretation.

Having received the digital document and the processing instruction text from the output terminal 52 of the headquarter, the output terminal 55 of the Sapporo branch searches in the processing instruction text for a line that starts with a character string specifying its own email address in the brackets. In this example, line 11 is found, so that processing specified in following lines 12 and 13 will be performed. In accordance with line 12, the printer prints a copy of pages 1 and 3. Since line 13 specifies "Transfer=", transmission and transfer processing is carried out with respect to each address specified therein.

The digital document data transferred along with the processing instruction text may be sent only after extracting pages specified in the "Print=" instruction. This can reduce the transmission time and the cost associated with use of the communication line.

As shown in FIG. 22, many transfer addresses may have to be specified. It is difficult, however, for the sender of the digital document to remember all the addresses, so that it would be beneficial if these addresses can be specified by abbreviations that are easy to remember.

In the present invention, transfer destinations may be specified by abbreviations as shown in FIG. 23 at lines 3 and 5.

When a transfer destination is specified by use of the abbreviation as shown, it is necessary to provide the processing definition record unit 21 in the output terminal 52. The processing definition record unit 21 stores therein unabbreviated addresses corresponding to abbreviations as shown in FIG. 24, thereby letting the abbreviations be converted into corresponding unabbreviated addresses.

Further, as shown in FIG. 22 at lines 3 and 13, a source apparatus from which data is transferred should be recognized when writing the processing instruction text. Such specifics cannot be described by anyone other than those who understand optimum transfer routes as shown in FIG. 21.

Further, it is possible to confuse the FAX telephone number 03-4444-5555 shown at line 3 of FIG. 22 with the FAX telephone number 011-222-3333 shown at line 13. As a result, a mistake may be made, producing a wrong processing instruction text as shown in FIG. 25.

In consideration of this, the present invention may allow all the transfer addresses to be collectively specified at the "Transfer=" line for the first output terminal as shown in FIG. 26 at lines 3 and 4. This frees the user from exercising care for transfer routes.

When the processing instruction text as shown in FIG. 26 is transferred, the optimum route selection unit 23 refers to positions of transfer destinations (addresses), availability of data transfer, specifications of printer apparatuses, etc., to convert the processing instruction text of FIG. 26 into the processing instruction text of FIG. 22 that explicitly shows optimum transfer routes.

As shown in FIG. 21, the output terminal 52 is accessible either through the Internet address color@company.com or through the FAX number (address) 03-6666-7777. As shown in FIG. 27, addresses for different communication lines are recorded in the relevant transfer destination record unit 22 with an aim of converting the processing instruction text to select optimum routes.

In the following, operation based on the processing instruction will be described with reference to FIG. 28.

Figure 28:
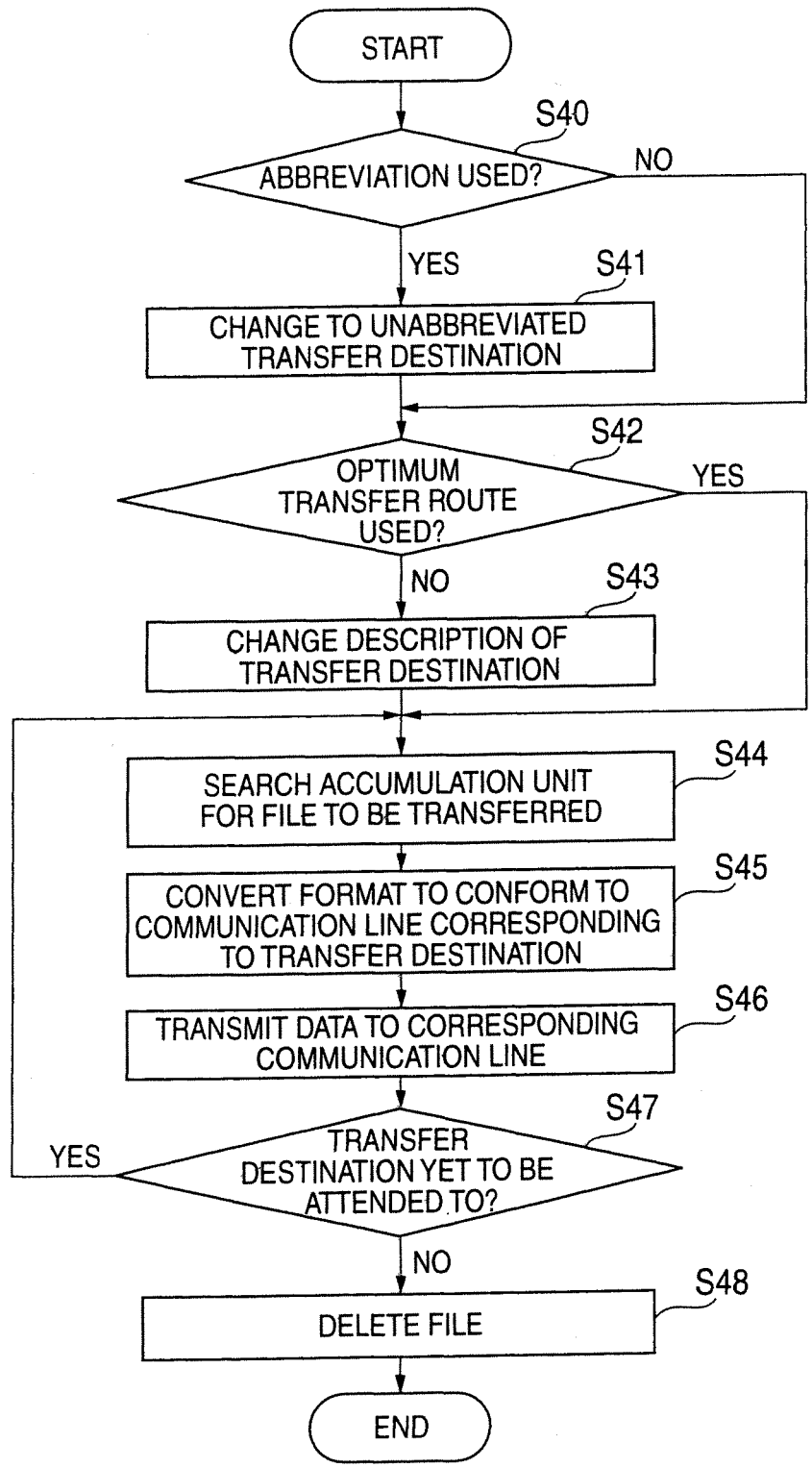
FIG. 28 is a flowchart of operation performed based on processing instruction.

When a processing instruction text is stored at the step S12 of FIG. 20, a step S40 of FIG. 28 will be performed.

At the step S40 of FIG. 28, the input/output control unit 5 checks whether abbreviations for transfer destinations are used at the "Transfer=" line of the recorded processing instruction text as was described with reference to FIG. 23. If an abbreviation is not used, the procedure goes to a step S42.

When the check at the step S40 gives an affirmative answer, the procedure goes to a step S41. At the step S41, the contents of the processing definition record unit 21 are referred to so as to convert the abbreviations of transfer destinations to unabbreviated transfer destinations (addresses).

At the step S42, the optimum route selection unit 23 checks if the transfer routes specified in the processing instruction text are optimum. If the answer is affirmative, the procedure goes to a step S44.

If the check at the step S42 gives a negative answer to indicate that the processing instruction text is that shown in FIG. 25 or FIG. 26, for example, the procedure goes to a step S43. At the step S43, the contents of the relevant transfer destination record unit 22 are referred to so as to convert the transfer destinations, thereby achieving optimum transfer routes as shown in FIG. 22.

At a step S44, the input/output control unit 5 searches the accumulation unit 4 for a file to be transferred. At a step S45, format conversion is performed to conform to a communication line corresponding to a transfer destination. At a step S46, the relevant digital document is transmitted from one of the communication units 1 through 3 connected to the corresponding line.

If the transfer destination is the output terminal of the present invention such as the output terminal 55 of the Sapporo branch or the output terminal 58 of the Fukuoka branch as shown in FIG. 21, the processing instruction text is attached to the email to be transferred.

If the transfer destination is the monochrome printing apparatus of the output terminal 53, data of pages 1 through 15 is transmitted ten times to print ten copies since line 6 of the processing instruction of FIG. 22 requests 10 copies of pages 1 through 15.

At a step S47, the input/output control unit 5 checks whether there is a transfer destination yet to be attended to. If the answer is affirmative, the procedure goes back to a step S44, and the steps S44 through S47 will be carried out for the new transfer destination.

If there is no transfer destination to be attended to, the procedure goes to a step S48, at which a file of the transferred data is removed.

The embodiment described above may assume a configuration in which the output terminal of the present invention is attached to or provided as part of a facsimile apparatus or the like. Alternatively, the output terminal of the present invention may be attached to or provided as part of a printer, a digital copier, or an integrated apparatus that is a combination of a digital copier, a printer, and a facsimile apparatus. Alternatively, the output terminal of the present invention may be attached to or provided as part of an information-processing apparatus such as a personal computer.

According to the present invention as described above, data transferred through communication lines of different data transfer schemes and input data are transferred to a designated destination or printed as printouts.

Further, the present invention can reduce cost and space for installation.

In the above embodiments, when an email address is used as a private identifier, the printout data sent from the same sender will be printed in response to the same identifier. If a user happens to know the email address of another user, the user with this knowledge can print all the printout data by entering the email address as an identifier into the output terminal. This poses a problem of security breach.

In the following embodiment, a configuration for heightening security by a simple means will be described.

A further embodiment of the present invention will be described with reference to FIG. 29 and FIG. 30.

Figure 29:
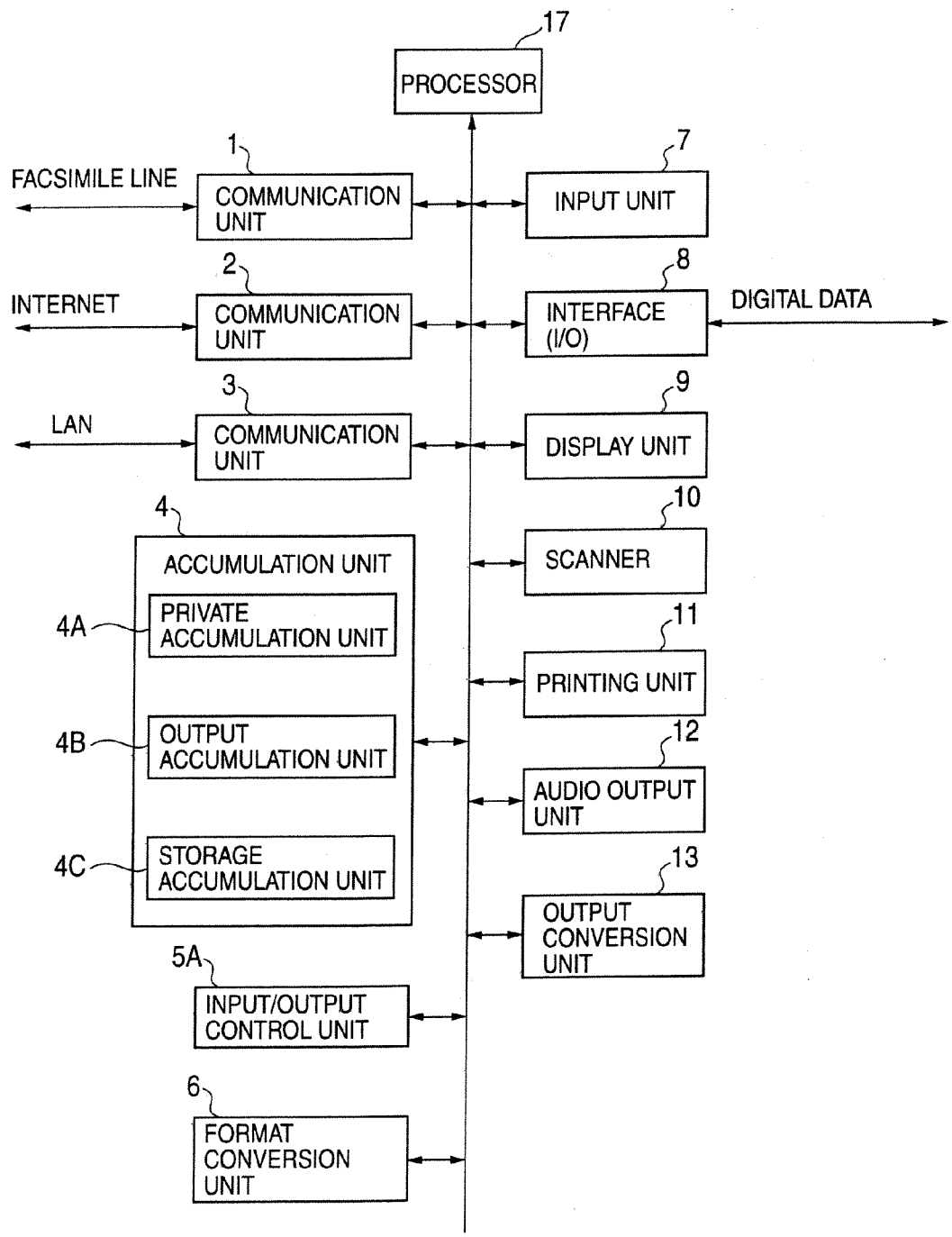
FIG. 29 is a block diagram of another embodiment of an output terminal according to the present invention.

FIG. 29 is a block diagram of this embodiment of the output terminal according to the present invention.

FIG. 30 is a flowchart of data accumulation operation according to the present embodiment. In FIG. 29, the same elements as those of the previous embodiments are referred to by the same numerals.

The output terminal of FIG. 29 includes the communication units 1 through 3, which are connected to the facsimile communication line, the Internet communication line, and the LAN communication line, respectively, to transmit and receive data to and from the corresponding communication line. The output terminal further includes the accumulation unit 4 comprised of the private accumulation unit 4A, the output accumulation unit 4B, and the storage accumulation unit 4C, each of which stores therein corresponding data. The output terminal further includes an input/output control unit 5A, the format conversion unit 6, the input unit 7, the interface (I/O) 8 for inputting/outputting digital data, the display unit 9, the scanner 10, the printing unit 11, the audio output unit 12, the output conversion unit 13, and the processor 17 provided for processing purposes. In this embodiment, the input/output control unit 5A attends to control associated with private identifiers by using as a private identifier either one of or both of a sender-specific private identifier defined on the sender side and a receiver-defined private identifier defined on the receiver side.

In the following, data accumulation operation in respect of the accumulation unit 4 will be described with reference to FIG. 30.

Here, FIG. 30 shows a case in which data is received from the Internet communication line connected to the communication unit 2.

At a step S10, the input/output control unit 5A checks whether the communication unit 2 has received incoming data, and waits until the check indicates reception of data.

At a step S11, the input/output control unit 5A checks whether the received data has a private identifier attached thereto. If the check gives an affirmative answer, the procedure goes to a step S12.

Here, the private identifier may be a sender-specific private identifier such as an email address that identifies the sender.

At the step S12, the operation mode of the input/output control unit 5A is identified. The operation mode includes a mode allowing use of only a sender-specific private identifier, a mode allowing use of only a receiver-defined private identifier, and a mode allowing use of both the sender-specific private identifier and the receiver-defined private identifier.

In the mode allowing use of only a sender-specific private identifier, at a step S13, the input/output control unit 5A stores the received data in the private accumulation unit 4A along with the sender-specific private identifier. Files stored in the private accumulation unit 4A include a data field, a field for storing a sender-specific private identifier, and a field for storing a receiver-defined private identifier. In this case, therefore, the sender email address taro@company.com is stored in the sender-specific private identifier field, data of the received digital document or the like being stored in the data field, and the receiver-defined private identifier field storing an initial value (e.g., 0).

In the mode allowing use of only a receiver-defined private identifier, at a step S14, the input/output control unit 5A generates a receiver-defined private identifier. For example, a numeric value is generated by combining the year, the date, and the time of reception of the email, and is set aside for use as a receiver-defined private identifier. In order to avoid confusion with another data having only one digit difference, a check digit may be computed according to predetermined rules based on the generated numeric value, and may be attached to the numeric value. A method of generating the check digit may be any one of the previous known methods, and the present invention is not limited use of a particular method.

At a step S15, the input/output control unit 5A sends email to notify the sender of the receiver-generated private identifier, for example, "052643". At a step S16, the input/output control unit 5A stores the receiver-defined private identifier and the received data in the private accumulation unit 4A. For example, the numeric value "052643" is stored in the receiver-defined private identifier field, the data of the received digital document being stored in the data field, and the sender-specific private identifier field storing its initial value (e.g., 0).

In the mode allowing use of both a sender-specific private identifier and a receiver-defined private identifier, at a step S17, the input/output control unit 5A generates a receiver-defined private identifier. At a step S18, the input/output control unit 5A sends email to notify the sender of the receiver-generated private identifier, for example, "052643". At a step S19, the input/output control unit 5A stores the sender-specific private identifier, the receiver-defined private identifier, and the received data in the private accumulation unit 4A. For example, the sender's email address taro@company.com is stored in the sender-specific private identifier field, the generated numeric value "052643" being stored in the receiver-defined private identifier field, and the data of the received digital document or the like being stored in the data field.

If the check at the step S11 gives a negative answer, the procedure goes to a step S20. At the step S20, the input/output control unit 5A checks whether the received data is provided with a storage identifier. If the answer is affirmative, the procedure goes to a step S21, at which the received data is stored in the storage accumulation unit 4C.

If the check at the step S20 indicates absence of a storage identifier, the procedure goes to a step S22. At the step S22, the input/output control unit 5A stores the received data in the output accumulation unit 4B.

Operation for outputting data from the accumulation unit 4, i.e., outputting data from the private accumulation unit 4A, outputting data from the output accumulation unit 4B, and outputting data from the storage accumulation unit 4C, is the same as in the first embodiment previously described, and a duplicate description thereof will be omitted.

In this manner, in the mode allowing use of only a sender-specific private identifier, the user enters his/her email address such as taro@company.com into the output terminal as a sender-specific private identifier, thereby having the requested document data printed out. In the mode allowing use of only a receiver-specific private identifier, the user enters into the output terminal a receiver-defined private identifier such as "052643" sent from the output terminal, thereby having the requested document data printed out. In the mode allowing use of both a sender-specific private identifier and a receiver-defined private identifier, the user enters into the output terminal his/her email address such as taro@company.com serving as a sender-specific private identifier and a receiver-defined private identifier such as "052643" sent from the output terminal, thereby having the requested document data printed as an printout.

In the description provided above, data that the output terminal receives is not limited to the printout data, and the type of output is not limited to the printout output. For example, musical digital data may be output as analog data in the form of a recorded cassette tape, or video digital data may be output as analog data as recorded videotape. Alternatively, the musical digital data delivered to the output terminal may be played as audio output on the spot, or the video digital data delivered to the output terminal may be played as video output on the spot.

Further, the present invention is not limited to these embodiments, but various variations and modifications may be made without departing from the scope of the present invention.

What is claimed is:

1. An apparatus, comprising:
   a communication unit which receives email through a communication line, the email having been sent by a user and including data;
   an accumulation unit which stores therein the data;
   a printout unit;
   an input unit which receives a first identifier entered by the user through direct operation thereof; and
   a control unit which generates a second identifier corresponding to the data, and sends the second identifier to the user by email via the communication unit, said control unit controlling said printout unit to print the data corresponding to the second identifier by reading the data from said accumulation unit if the first identifier matches the second identifier,
   wherein the email received by said communication unit includes a third identifier, wherein the third identifier is a character string that is written in a text of the email along with a specific character string, and said input unit receives a fourth identifier entered by the user in addition to the first identifier, said control unit controlling said printout unit to print the data corresponding to the second identifier by reading the data from said accumulation unit if the first identifier matches the second identifier and if the third identifier matches the fourth identifier; and
   the control unit controls whether to print the data, by operating in one of a first mode in which only the first and second identifiers are used, a second mode in which only the third and fourth identifiers are used, and a third mode in which the first, second, third, and fourth identifiers are used.

* * * * *